US012749456B2

(12) United States Patent
Kim et al.

(10) Patent No.: US 12,749,456 B2
(45) Date of Patent: Sep. 29, 2026

(54) SCAN DRIVER, AND ELECTRONIC DEVICE INCLUDING THE SCAN DRIVER

(71) Applicant: Samsung Display Co., Ltd., Yongin-si (KR)

(72) Inventors: Kyung Ho Kim, Yongin-si (KR); Hyeong Seok Kim, Yongin-si (KR); Byung Chang Yu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/249,442

(22) Filed: Jun. 25, 2025

(65) Prior Publication Data

US 2026/0155106 A1 Jun. 4, 2026

(30) Foreign Application Priority Data

Dec. 3, 2024 (KR) ........................ 10-2024-0177337

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0426* (2013.01); *G09G 2300/0842* (2013.01); *G09G 2310/0286* (2013.01)

(58) Field of Classification Search
CPC ............... G09G 3/3266; G09G 3/3233; G09G 2300/0426; G09G 2300/0842; G09G 2310/0286
See application file for complete search history.

(56) References Cited

U.S. PATENT DOCUMENTS

| | | | | |
|---|---|---|---|---|
| 2013/0169319 | A1* | 7/2013 | Sasaki | G11C 19/28 327/108 |
| 2016/0240145 | A1* | 8/2016 | Jeong | G06F 1/04 |
| 2017/0323593 | A1* | 11/2017 | Kim | G09G 3/2092 |
| 2018/0144688 | A1* | 5/2018 | Lee | G09G 3/3266 |
| 2018/0151148 | A1* | 5/2018 | Wu | G09G 3/20 |
| 2018/0366067 | A1* | 12/2018 | Jang | G09G 3/3266 |
| 2019/0155433 | A1* | 5/2019 | Park | G06F 3/0416 |
| 2021/0201814 | A1* | 7/2021 | Choi | G09G 3/3275 |
| 2022/0208113 | A1* | 6/2022 | Choi | G09G 3/3233 |
| 2023/0112514 | A1* | 4/2023 | Heo | G09G 3/3291 345/204 |

* cited by examiner

*Primary Examiner* — Amit Chatly
(74) *Attorney, Agent, or Firm* — Womble Bond Dickinson (US) LLP

(57) ABSTRACT

A scan driver includes stages configured to output scan signals, wherein an n-th stage of the stages includes a voltage-charging portion connected to a first power line and to a second power line, and configured to transfer a voltage of the first power line to a first output control node in response to a first carry signal from an (n−1)-th stage of the stages, and transfer a voltage of the second power line to the first output control node in response to a voltage of a second output control node, a voltage reset portion including transistors connected in series between the first output control node and a third power line, and configured to reset a voltage of the first output control node, and scan signal output portions configured to output one or more of the scan signals in response to the voltage of the second output control node.

20 Claims, 8 Drawing Sheets

SCAN DRIVER, AND ELECTRONIC DEVICE INCLUDING THE SCAN DRIVER

CROSS-REFERENCE TO RELATED APPLICATION

The present application claims priority to, and the benefit of, Korean Patent Application Number 10-2024-0177337, filed on Dec. 3, 2024, in the Korean Intellectual Property Office, the entire disclosure of which is incorporated herein by reference.

BACKGROUND

1. Field

Various embodiments of the present disclosure relate to a scan driver, and an electronic device including the scan driver.

2. Description of the Related Art

With the development of information technology, the importance of a display device, which is a connection medium between a user and information, has been emphasized. Owing to the importance of display devices, the use of various kinds of display devices, such as a liquid crystal display device, an organic light-emitting display device, and a plasma display device, has increased.

A display device includes a display panel including pixels, a scan driver for sequentially applying a scan signal to scan lines connected to rows of the pixels, and a data driver for applying data signals to data lines connected to columns of the pixels. For example, the scan driver may select a pixel to which a data voltage is to be supplied among the pixels. The scan driver may be configured in the form of a shift register to sequentially provide a turn-on level scan signal on a scan line-by-scan line basis.

The above descriptions are intended solely to provide an understanding of the background art for the technical spirits of the present disclosure and are not to be construed as constituting prior art known to those skilled in the art of the present disclosure.

SUMMARY

Various embodiments of the present disclosure are directed to a scan driver with improved reliability and an electronic device including the scan driver. For example, a scan driver may include a plurality of stages, and a first output control node (or a Common Qnode Switch (CQS) node) of each of the stages may be charged to a high voltage level, and may be reset based on a voltage of a second node (or a QB node) of the current stage and a voltage of a second node of the next stage. Accordingly, the operation of the scan driver may be simplified and the scan driver may have improved reliability.

A scan driver according to one or more embodiments of the present disclosure includes stages configured to output scan signals, wherein an n-th stage (n being an integer greater than 1) of the stages includes a voltage-charging portion connected to a first power line and to a second power line, and configured to transfer a voltage of the first power line to a first output control node in response to a first carry signal from an (n−1)-th stage of the stages, and transfer a voltage of the second power line to the first output control node in response to a voltage of a second output control node, a voltage reset portion including transistors connected in series between the first output control node and a third power line, and configured to reset a voltage of the first output control node, and scan signal output portions configured to output one or more of the scan signals in response to the voltage of the second output control node.

The voltage-charging portion may include a first transistor connected between the first power line and the first output control node, and having a gate electrode connected to a first carry line configured to receive the first carry signal, a second transistor connected between the second power line and the first output control node, and having a gate electrode connected to the second output control node, and a first capacitor connected between the first power line and the first output control node.

The transistors connected in series may include a third transistor connected between the first output control node and the third power line, and having a gate electrode connected to a second node of the n-th stage, and a fourth transistor connected between the third transistor and the third power line, and having a gate electrode connected to a second node of an (n+1)-th stage of the stages, and wherein the third and fourth transistors are configured to be turned on in response to a voltage of the second node of the n-th stage and a voltage of the second node of the (n+1)-th stage so that the first output control node has a voltage of the third power line.

One of the scan signal output portions may be connected to a scan clock line, and may be configured to output a signal of the scan clock line as one of the scan signals according to the voltage of the second output control node.

One of the scan signal output portions may include a fifth transistor connected between a first node and a third node, and having a gate electrode connected to the first output control node, a second capacitor connected between the third node and the second output control node, a sixth transistor connected between a scan clock line and a scan line, and having a gate electrode connected to the third node, and a seventh transistor connected between the scan line and the third power line, and having a gate electrode connected to a second node of the n-th stage.

The n-th stage may further include an eighth transistor configured to transfer a boosting clock signal to the second output control node in response to a voltage of the first node to raise a voltage of the third node through the second capacitor.

The n-th stage may further include a boosting controller configured to transfer a boosting clock signal to the second output control node in response to a voltage of a first node, and to raise the voltage of the first node according to the boosting clock signal.

The n-th stage may include an eighth transistor connected between a boosting clock line and the second output control node, and having a gate electrode connected to a first node, a third capacitor connected between the gate electrode of the eighth transistor and the second output control node, and a ninth transistor connected between the second output control node and a fourth power line, and having a gate electrode connected to a second node.

The n-th stage may further include a carry signal output portion connected between a carry clock line and a fourth power line, and configured to output a signal of the carry clock line as a second carry signal in response to a voltage of a first node, and to output a voltage of the fourth power line as the second carry signal in response to a voltage of a second node.

A scan driver according to one or more embodiments of the present disclosure includes stages configured to output scan signals, an n-th stage of the stages including a first transistor having a first electrode connected to a first power line, a second electrode connected to a first output control node, and a gate electrode connected to a first carry line connected to an (n−1)-th stage of the stages, a second transistor having a first electrode connected to a second power line, a second electrode connected to the first output control node, and a gate electrode connected to a second output control node, a first capacitor connected between the first power line and the first output control node, transistors connected in series between the first output control node and a third power line, and scan signal output portions configured to output one or more of the scan signals in response to a voltage of the second output control node.

A voltage of the first power line may be higher than a voltage of the second power line.

The n-th stage may further include a 10th transistor having a first electrode connected to a carry clock line, a second electrode connected to a second carry line connected to the (n−1)-th stage and to an (n+1)-th stage of the stages, and a gate electrode connected to a first node, and an 11th transistor having a first electrode connected to the second carry line, a second electrode connected to a fourth power line, and a gate electrode connected to a second node.

The transistors connected in series may include a third transistor connected between the first output control node and the third power line, and having a gate electrode connected to a second node of the n-th stage, and a fourth transistor connected between the third transistor and the third power line, and having a gate electrode connected to a second node of an (n+1)-th stage of the stages, wherein the third and fourth transistors are configured to be turned on in response to a voltage of the second node of the n-th stage and a voltage of the second node of the (n+1)-th stage so that a voltage of the first output control node has a voltage of the third power line.

One of the scan signal output portions may include a fifth transistor connected between a first node and a third node, and having a gate electrode connected to the first output control node, a second capacitor connected between the third node and the second output control node, a sixth transistor connected between a scan clock line and a scan line, and having a gate electrode connected to the third node, and a seventh transistor connected between the scan line and the third power line, and having a gate electrode connected to a second node of the n-th stage.

An electronic device including a scan driver according to one or more embodiments of the present disclosure includes a display panel including scan lines, and pixels connected to the scan lines, a processor configured to provide input image data, a controller configured to receive the input image data from the processor, and configured to drive the display panel, and a scan driver configured to supply scan signals to the display panel, and including stages configured to output the scan signals to the scan lines, an n-th stage of the stages including a voltage-charging portion connected to a first power line and a second power line, and configured to transfer a voltage of the first power line to a first output control node in response to a first carry signal from an (n−1)-th stage of the stages, and to transfer a voltage of the second power line to the first output control node in response to a voltage of a second output control node, a voltage reset portion including transistors connected in series between the first output control node and a third power line, and configured to reset a voltage of the first output control node, and scan signal output portions configured to output one or more of the scan signals in response to the voltage of the second output control node.

The voltage of the first output control node may be configured to fluctuate by one of the first carry signal of the (n−1)-th stage, the voltage of the second output control node, and a voltage of a second node of an (n+1)-th stage of the stages.

The voltage of the first power line may be configured to be applied as the voltage of the first output control node, and the voltage of the second power line is configured to be applied as the voltage of the first output control node in response to the voltage of the second output control node.

The voltage of the first output control node may be configured to have a voltage of the third power line in response to a voltage of a second node of the n-th stage and a voltage of a second node of an (n+1)-th stage of the stages.

The n-th stage may be configured to transfer a boosting clock signal to the second output control node in response to a voltage of a first node, and may be configured to raise the voltage of the first node according to the boosting clock signal transferred to the second output control node.

A third node may be configured to be electrically isolated from a first node according to the voltage of the first node and the voltage of the first output control node.

DETAILED DESCRIPTION

Figure 1:
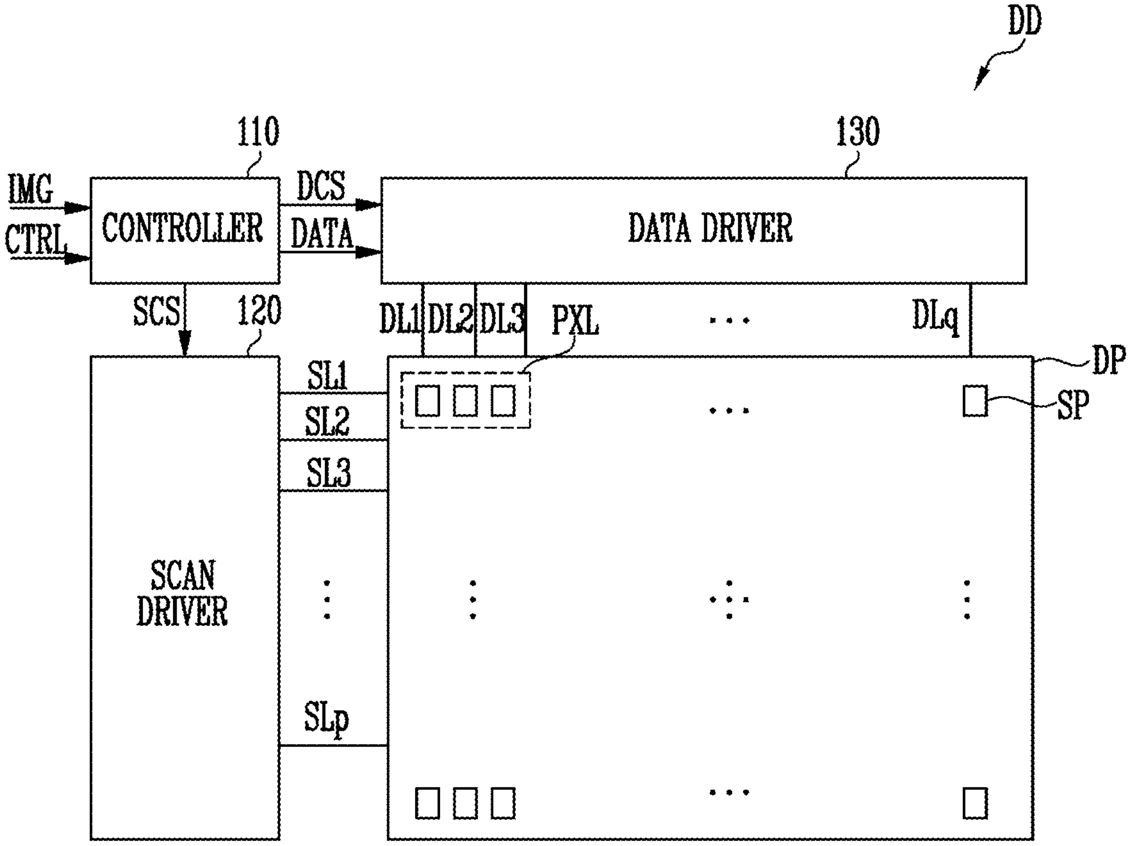
FIG. 1 is a block diagram illustrating one or more embodiments of a display device.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same"

may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating one or more embodiments of a display device DD.

Referring to FIG. 1, the display device DD may include a display panel DP, a controller 110, a scan driver 120, and a data driver 130.

The display panel DP may include sub-pixels SP. The sub-pixels SP may be connected to the scan driver 120 via first to p-th scan lines SL1 to SLp (p being an integer). The sub-pixels SP may be connected to the data driver 130 via first to q-th data lines DL1 to DLq (q being an integer).

The sub-pixels SP may generate light of two or more colors. For example, each of the sub-pixels SP may produce light of colors such as red, green, blue, cyan, magenta, yellow, or the like.

Two or more sub-pixels of the sub-pixels SP may form a single pixel PXL. For example, a pixel PXL may include three sub-pixels as shown in FIG. 1. As such, the pixel PXL may emit light of various colors and various luminance depending on the combination of light emitted from the sub-pixels included therein.

The controller 110 may control general operations of the display device DD. The controller 110 may receive input image data IMG and a corresponding control signal CTRL from the outside of the controller 110. The controller 110 may provide a scan control signal SCS, and a data control signal DCS in response to the control signal CTRL.

The controller 110 may convert the input image data IMG to be suitable for the display device DD or the display panel DP, and may output image data DATA. In embodiments, the controller 110 may align the input image data IMG to be suitable for the sub-pixels SP in units of rows and output the image data DATA.

The scan driver 120 may be connected to the sub-pixels SP arranged in a row direction via the first to p-th scan lines SL1 to SLp. The scan driver 120 may output scan signals to the first to p-th scan lines SL1 to SLp in response to the scan control signal SCS. In embodiments, the scan control signal SCS may include a start signal indicating the start of each frame, a horizontal synchronization signal, and the like.

The scan driver 120 may be arranged on one side of the display panel DP. However, embodiments are not limited thereto. For example, the scan driver 120 may be separated into two or more drivers physically and/or logically separated, and such drivers may be respectively located on one side of the display panel DP and on a another side of the display panel DP opposite the one side. As such, the scan driver 120 may be located around the display panel DP in various forms according to embodiments.

The data driver 130 may be connected to the sub-pixels SP arranged in a column direction via the first to q-th data lines DL1 to DLq. The data driver 130 may receive the image data DATA and the data control signal DCS from the controller 110. The data driver 130 may operate in response to the data control signal DCS. In embodiments, the data control signal DCS may include a source start signal, a source shift clock, a source output enable signal, and the like.

The data driver 130 may apply data signals having grayscale voltages corresponding to the image data DATA to the first to q-th data lines DL1 to DLq. When a scan signal is applied to each of the first to p-th scan lines SL1 to SLp, the data signals corresponding to the image data DATA may be applied to the first to q-th data lines DL1 to DLq. Accordingly, the sub-pixels SP may generate light corresponding to the data signals, and the display panel DP may display the image.

In embodiments, the scan driver 120 and the data driver 130 may include complementary metal-oxide semiconductor (CMOS) circuit devices.

The components of the data driver 130 and the components of the controller 110 may be mounted on a single integrated circuit. In one or more embodiments, the data driver 130 and the controller 110 may be included in a driver integrated circuit (DIC). In such case, the data driver 130 and the controller 110 may be functionally distinct components in a single driver integrated circuit (DIC).

Figure 2:
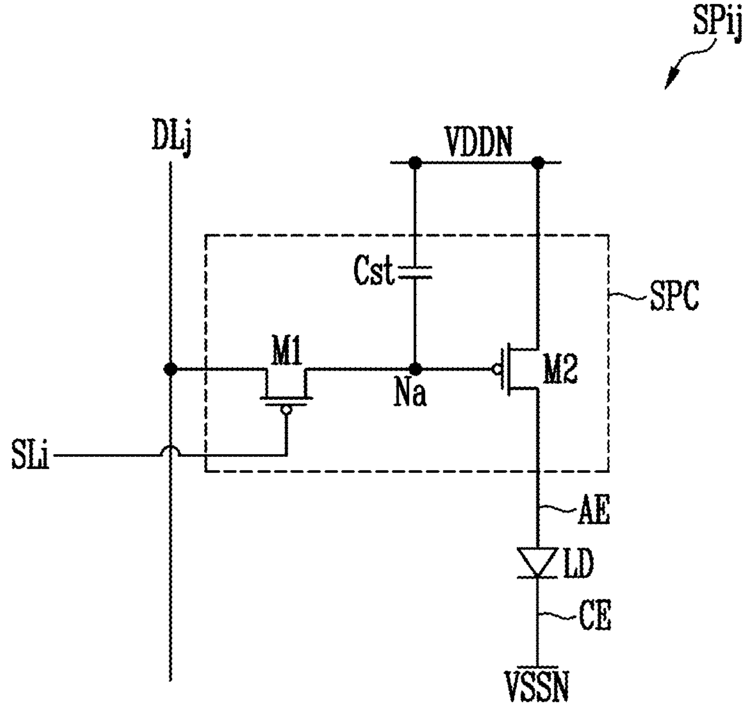
FIG. 2 is a schematic diagram of an equivalent circuit of one or more embodiments of one of sub-pixels of FIG. 1.

FIG. 2 is a schematic diagram of an equivalent circuit of one or more embodiments of one of the sub-pixels SP of FIG. 1.

In FIG. 2, a sub-pixel SPij arranged in an i-th row (where i is an integer greater than or equal to 1 and less than or equal to p) and a j-th column (where j is an integer greater than or equal to 1 and less than or equal to q) is illustrated as an example.

Referring to FIG. 2, the sub-pixel SPij may include a sub-pixel circuit SPC and a light-emitting device LD.

The light-emitting device LD may be connected between a first driving power node VDDN and a second driving power node VSSN. The first driving power node VDDN may receive a first driving voltage. The second driving power node VSSN may receive a second driving voltage. The first driving voltage may have a higher voltage level than the second driving voltage.

The light-emitting device LD may be connected between an anode AE and a cathode CE. The anode AE may be connected to the first driving power node VDDN via the sub-pixel circuit SPC. For example, the anode AE may be connected to the first driving power node VDDN via one or more transistors included in the sub-pixel circuit SPC. The cathode CE may be connected to the second driving power node VSSN. The light-emitting device LD may be configured to emit light in response to a current flowing from the anode AE to the cathode CE.

The sub-pixel circuit SPC may be connected to an i-th scan line SLi of the first to p-th scan lines SL1 to SLp of FIG. 1, and to a j-th data line DLj of the first to q-th data lines DL1 to DLq of FIG. 1. In response to the scan signal received via the i-th scan line SLi, the sub-pixel circuit SPC may control the light-emitting device LD to emit light in accordance with the data signal received via the j-th data line DLj. For the above-described operations, the sub-pixel circuit SPC may include circuit devices, such as transistors and one or more capacitors.

The transistors in the sub-pixel circuit SPC may include P-type transistors and/or N-type transistors. In embodiments, the transistors of the sub-pixel circuit SPC may include Metal Oxide Silicon Field Effect Transistors (MOSFETs). In embodiments, the transistors of the sub-pixel circuit SPC may include an amorphous silicon semiconductor, monocrystalline silicon, polycrystalline silicon, an oxide semiconductor, or the like.

Referring to FIG. 2, a gate electrode of a first transistor M1 may be connected to the i-th scan line SLi, a first electrode may be connected to the j-th data line DLj, and a second electrode may be connected to one electrode of a storage capacitor Cst. The first transistor M1 may be referred to as a scan transistor.

A gate electrode of a second transistor M2 may be connected to the second electrode of the first transistor M1, a first electrode may be connected to the first driving power node VDDN, and a second electrode may be connected to the anode AE of the light-emitting device LD. The second transistor M2 may be referred to as a driving transistor.

One electrode of the storage capacitor Cst may be connected to the gate electrode of the second transistor M2, and the other electrode may be connected to the first driving power node VDDN.

The anode AE of the light-emitting device LD may be connected to the second electrode of the second transistor M2, and the cathode CE may be connected to the second driving power node VSSN.

According to one or more embodiments, when a scan signal of a turn-on level (here, a low level) is applied through the i-th scan line SLi, the first transistor M1 may be turned on. At this time, a data voltage applied to the j-th data line DLj may be stored in the storage capacitor Cst.

A driving current corresponding to the voltage difference between the electrodes of the storage capacitor Cst may flow between the first and second electrodes of the second transistor M2. Accordingly, the light-emitting device LD may emit light at luminance corresponding to the data voltage.

Then, when a scan signal of a turn-off level (here, a high level) is applied through the i-th scan line SLi, the first transistor M1 may be turned off, and the j-th data line DLj and one electrode of the storage capacitor Cst may be electrically isolated. Thus, even when the data voltage of the j-th data line DLj fluctuates, a voltage stored on one electrode of the storage capacitor Cst may not fluctuate.

Embodiments of the present disclosure may be applied not only to the sub-pixel SPij shown in FIG. 2, but also to sub-pixels having another sub-pixel circuit according to the prior art.

Figure 3:
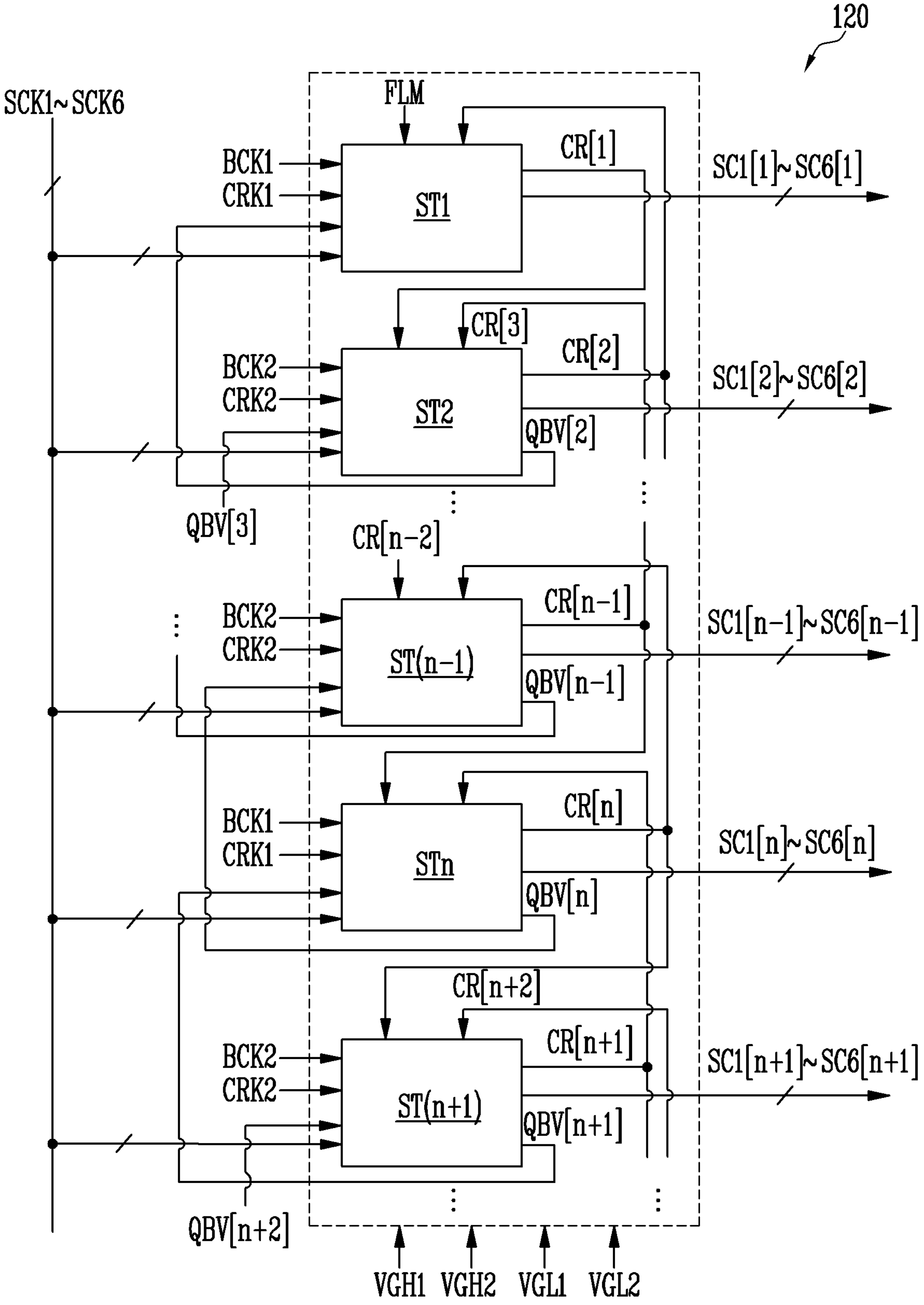
FIG. 3 is a block diagram illustrating one or more embodiments of a scan driver included in the display device of FIG. 1.

FIG. 3 is a block diagram illustrating one or more embodiments of the scan driver 120 included in the display device DD of FIG. 1.

Referring to FIG. 3, the scan driver 120 may include a plurality of stages ST1 to ST(n+1) (or scan stages). The stages ST1 to ST(n+1) may correspond to or be connected to the first to the p-th scan lines SL1 to SLp of FIG. 1.

Figure 5:
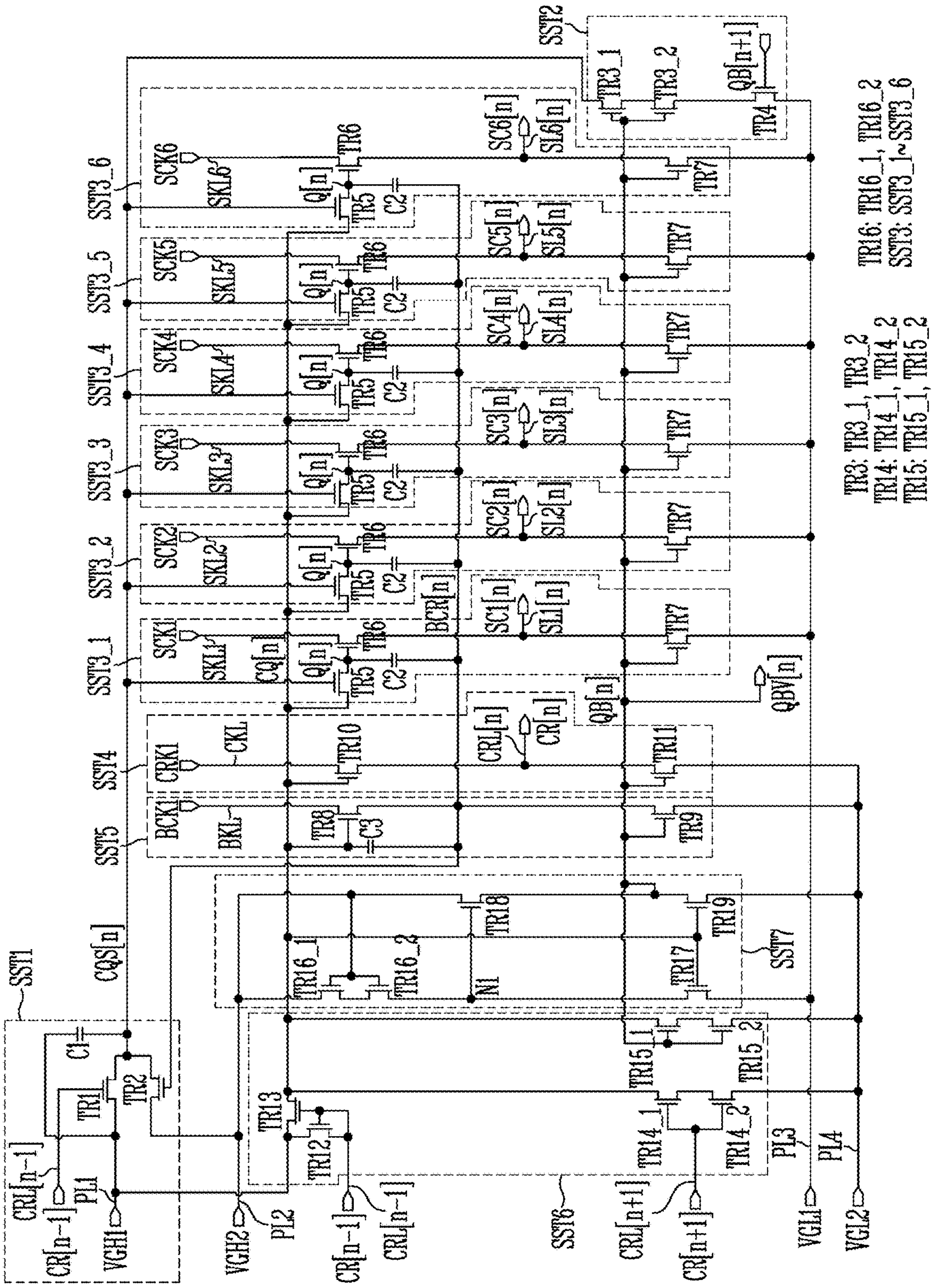
FIG. 5 is a schematic diagram of an equivalent circuit of one or more embodiments of the stage of FIG. 4.

The stages ST1 to ST(n+1) may be connected to first to sixth scan clock lines SKL1 to SKL6 (see FIG. 5), a carry clock line CKL (see FIG. 5), and a boosting clock line BKL (see FIG. 5). The first to sixth scan clock lines SKL1 to SKL6, the carry clock line CKL, and the boosting clock line BKL may be applied with input signals for the stages ST1 to ST(n+1).

First to sixth scan clock signals SCK1 to SCK6 may be respectively applied to the stages ST1 to ST(n+1) through the first to sixth scan clock lines SKL1 to SKL6. One of carry clock signals CRK1 and CRK2 may be applied to the stages ST1 to ST(n+1) via the carry clock line CKL. For example, a first carry clock signal CRK1 may be applied to odd-numbered stages via the carry clock line CKL. A second carry clock signal CRK2 may be applied to even-numbered stages via the carry clock line CKL. One of boosting clock signals BCK1 and BCK2 may be applied to the stages ST1 to ST(n+1) via the boosting clock line BKL. For example, a first boosting clock signal BCK1 may be applied to the odd-numbered stages via the boosting clock line BKL. A second boosting clock signal BCK2 may be applied to the even-numbered stages via the boosting clock line BKL.

The stages ST1 to ST(n+1) may receive a first power voltage VGH1, a second power voltage VGH2, a third power voltage VGL1, and a fourth power voltage VGL2 via a first power line PL1 (see FIG. 5), a second power line PL2 (see FIG. 5), a third power line PL3 (see FIG. 5), and a fourth power line PL4 (see FIG. 5), respectively. The first power voltage VGH1, the second power voltage VGH2, the third power voltage VGL1, and the fourth power voltage VGL2 may be provided from a power supply located externally of the scan driver 120. In embodiments, the first power voltage VGH1 may have a higher voltage level than the second power voltage VGH2, and the third power voltage VGL1 may have a lower voltage level than the second power voltage VGH2. The fourth power voltage VGL2 may have a lower voltage level than the third power voltage VGL1. For example, the first power voltage VGH1 may be about 25 V and the second power voltage VGH2 may be about 15 V. The third power voltage VGL1 may be about −5 V, and the fourth power voltage VGL2 may be about −9 V. However, embodiments are not limited thereto.

Each of the stages ST1 to ST(n+1) may be connected to previous and subsequent stages via carry lines. A second node QB[n] (see FIG. 5) of each of the stages ST1 to ST(n+1) may be connected to the previous stage.

The first stage ST1 may receive a scan start signal FLM (or a start pulse) as a carry signal of the previous stage. The first stage ST1 may receive a carry signal CR[2] of the second stage ST2. The first stage ST1 may receive a voltage QBV[2] of the second node of the second stage ST2. The first stage ST1 may output a carry signal CR[1] and first to sixth scan signals SC1[1] to SC6[1] generated by the first stage ST1.

The second stage ST2 may receive the carry signal CR[1] of the first stage ST1 and a carry signal CR[3] of the third stage ST3. The second stage ST2 may receive a voltage QBV[3] of the second node of the third stage ST3. The second stage ST2 may output the carry signal CR[2] and first to sixth scan signals SC1[2] to SC6[2] generated by the second stage ST2. The second stage ST2 may output the voltage QBV[2] of the second node.

The (n−1)-th stage ST(n−1) may receive a carry signal CR[n−2] of the previous stage and a carry signal CR[n] of the n-th stage STn. The (n−1)-th stage ST(n−1) may receive a voltage QBV[n] of the second node of the n-th stage STn. The (n−1)-th stage ST(n−1) may output a carry signal CR[n−1] and first to sixth scan signals SC1[*n*−1] to SC6[*n*−1] generated by the (n−1)-th stage ST(n−1). The (n−1)-th stage ST(n−1) may output a voltage QBV[n−1] of the second node.

The n-th stage STn may receive the carry signal CR[n−1] of the (n−1)-th stage ST(n−1) and a carry signal CR[n+1] of the (n+1)-th stage ST(n+1). The n-th stage STn may receive a voltage QBV[n+1] of the second node of the (n+1)-th stage ST(n+1). The n-th stage STn may output the carry signal CR[n] and first to sixth scan signals SC1[*n*] to SC6[*n*] generated by the n-th stage STn. The n-th stage STn may output the voltage QBV[n] of the second node.

The (n+1)-th stage ST(n+1) may receive the carry signal CR[n] of the n-th stage STn and a carry signal CR[n+2] of the subsequent stage. The (n+1)-th stage ST(n+1) may receive a voltage QBV[n+2] of the second node of the subsequent stage. The (n+1)-th stage ST(n+1) may output the carry signal CR[n+1] and first to sixth scan signals SC1[*n*+1] to SC6[*n*+1] generated by the (n+1)-th stage ST(n+1). The (n+1)-th stage ST(n+1) may output the voltage QBV[n+1] of the second node.

For example, when the (n+1)-th stage ST(n+1) is the last stage, the (n+1)-th stage ST(n+1) may not receive the carry signal and the voltage of the second node of the subsequent stage. When the (n+1)-th stage ST(n+1) is the last stage, dummy stages may be added to provide a carry signal and a voltage of a second node of the subsequent stage.

Figure 4:
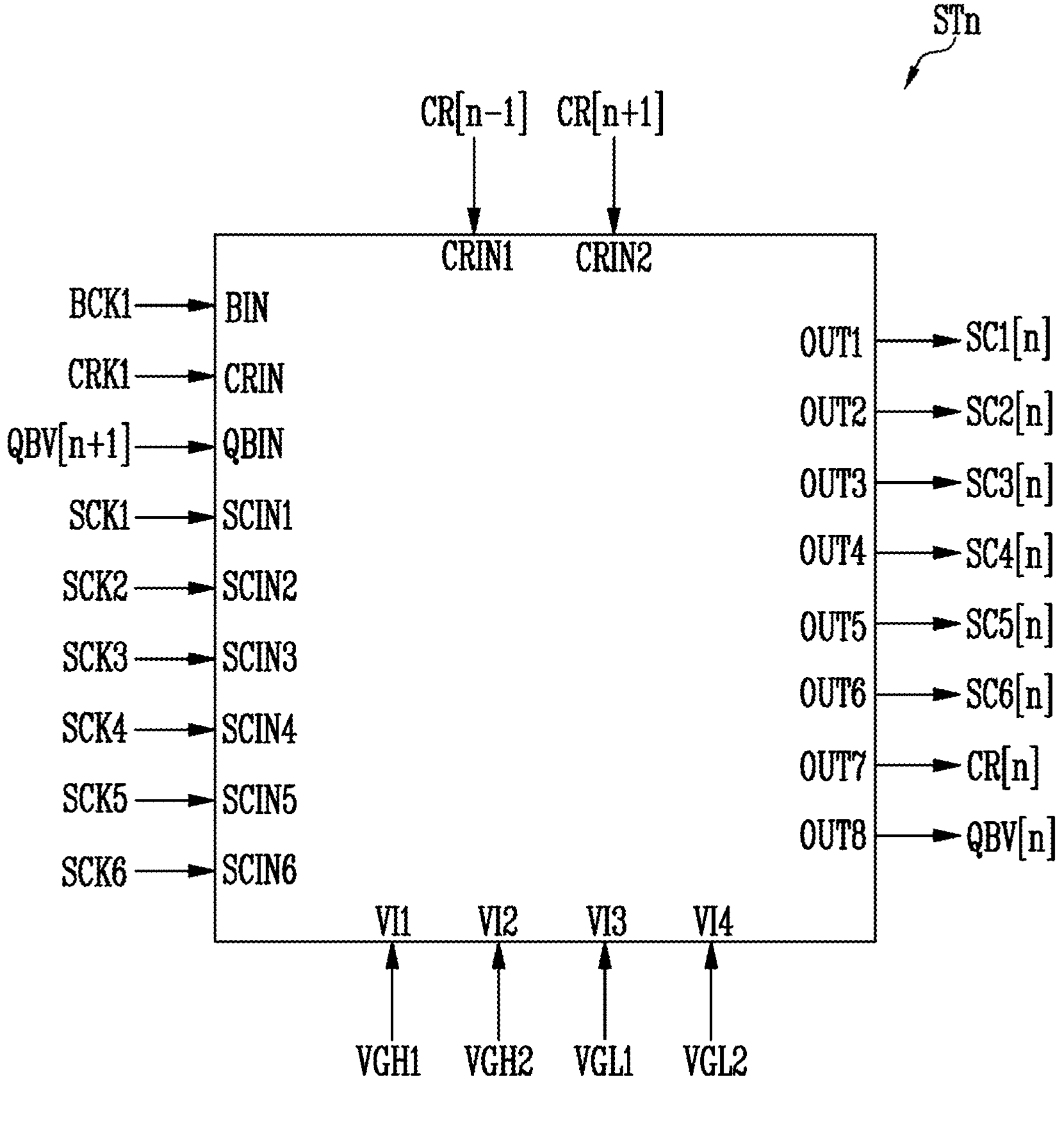
FIG. 4 is a block diagram illustrating one or more embodiments of a stage included in the scan driver of FIG. 3.

FIG. 4 is a block diagram illustrating one or more embodiments of the stage STn included in the scan driver 120 of FIG. 3.

FIG. 4 illustrates the n-th stage STn (where n is a positive integer less than p). Because the first to (n+1)-th stages ST1 to ST(n+1) are substantially the same or similar to each other, for clarity and brevity, the n-th stage STn will be described by way of example.

Referring to FIGS. 3 and 4, the n-th stage STn may include first to sixth scan clock input terminals SCIN1 to SCIN6, a second node input terminal QBIN, a carry clock input terminal CRIN, a boosting clock input terminal BIN, first to fourth power input terminals VI1 to VI4, first and second carry input terminals CRIN1 and CRIN2, and first to eighth output terminals OUT1 to OUT8.

The first to sixth scan clock input terminals SCIN1 to SCIN6 may receive the first to sixth scan clock signals SCK1 to SCK6 applied to the first to sixth scan clock lines SKL1 to SKL6 (see FIG. 5). For example, the first scan clock input terminal SCIN1 may be connected to the first scan clock line SKL1, and may receive the first scan clock signal SCK1.

The second node input terminal QBIN may receive the voltage QBV[n+1] of the second node of the (n+1)-th stage ST(n+1). For example, the second node input terminal QBIN may be connected to the second node of the (n+1)-th stage ST(n+1), and may receive the voltage QBV[n+1] of the second node of the (n+1)-th stage ST(n+1). The voltage QBV[n+1] provided to the second node input terminal QBIN may be delayed, and may have a later phase than the voltage QBV[n] of the second node QB[n] (see FIG. 5) of the n-th stage STn. The (n+1)-th stage ST(n+1) may be a subsequent stage of which a voltage is applied later than that of the n-th stage STn.

The carry clock input terminal CRIN may receive one of the carry clock signals CRK1 and CRK2 applied to the carry clock line CKL (see FIG. 5). For example, the carry clock input terminal CRIN of each of the odd-numbered stages may be connected to the carry clock line CKL, and may receive the first carry clock signal CRK1. The carry clock input terminal CRIN of each of the even-numbered stages is connected to the carry clock line CKL and may receive the second carry clock signal CRK2.

The boosting clock input terminal BIN may receive one of the boosting clock signals BCK1 and BCK2 applied to the boosting clock line BKL (see FIG. 5). For example, the boosting clock input terminal BIN of each of the odd-numbered stages may be connected to the boosting clock line BKL, and may receive the first boosting clock signal BCK1. The boosting clock input terminal BIN of each of the even-numbered stages is connected to the boosting clock line BKL, and may receive the second boosting clock signal BCK2.

The first power input terminal VI1 may be connected to the first power line PL1 and may receive the first power voltage VGH1, and the second power input terminal VI2 may be connected to the second power line PL2 and may receive the second power voltage VGH2. The third power input terminal VI3 may be connected to the third power line PL3 and may receive the third power voltage VGL1, and the fourth power input terminal VI4 may be connected to the fourth power line PL4 and may receive the fourth power voltage VGL2.

The first and second carry input terminals CRIN1 and CRIN2 may receive the carry signal CR[n−1] of the (n−1)-th stage ST(n−1) and the carry signal CR[n+1] of the (n+1)-th stage ST(n+1), respectively, which are applied to (n−1)-th and (n+1)-th carry lines CRL[n−1] and CRL[n+1] (see FIG. 5), respectively. The carry signal CR[n−1] of the (n−1)-th stage ST(n−1) and the carry signal CR[n+1] of the (n+1)-th stage ST(n+1) may have a phase difference. For example, the first carry input terminal CRIN1 may be connected to the carry line CRL[n−1] of the (n−1)-th stage ST(n−1), and may receive the carry signal CR[n−1] of the (n−1)-th stage ST(n−1). The (n−1)-th stage ST(n−1) may be a previous stage of the n-th stage STn. The second carry input terminal CRIN2 may be connected to the carry line CRL[n+1] of the (n+1)-th stage ST(n+1), and may receive the carry signal CR[n+1] of the (n+1)-th stage ST(n+1). The (n+1)-th stage ST(n+1) may be a subsequent stage of the n-th stage STn.

The first to sixth output terminals OUT1 to OUT6 are connected to first to sixth scan lines SL1[*n*] to SL6[*n*] (see FIG. 5) and may output the first to sixth scan signals SC1[*n*] to SC6[*n*]. For example, the first output terminal OUT1 is connected to the first scan line SL1[*n*], and may output the first scan signal SC1[*n*].

The seventh output terminal OUT7 is connected to a carry line CRL[n] (see FIG. 5) of the n-th stage STn, and may output the carry signal CR[n] of the n-th stage STn. The carry signal CR[n] of the n-th stage STn output from the seventh output terminal OUT7 may be provided to the (n−1)-th stage ST(n−1) and the (n+1)-th stage ST(n+1). The carry signal CR[n] of the n-th stage STn output from the seventh output terminal OUT7 may be a signal synchronized to the first carry clock signal CRK1 provided to the carry clock input terminal CRIN during a driving period.

The eighth output terminal OUT8 is connected to the second node QB[n] of the n-th stage STn, and may output a potential or the voltage QBV[n] of the second node QB[n] of the n-th stage STn. The voltage QBV[n] of the second node QB[n] of the n-th stage STn output from the eighth output terminal OUT8 may be provided to the (n−1)-th stage ST(n−1).

FIG. 5 is a schematic diagram of an equivalent circuit of one or more embodiments of the stage STn of FIG. 4.

Referring to FIGS. 3, 4, and 5, the n-th stage STn (where n is a natural number) may include a voltage-charging portion SST1, a voltage reset portion SST2, scan signal output portions SST3, a carry signal output portion SST4, a boosting controller SST5, a first node controller SST6, and a second node controller SST7. For clarity and brevity, the n-th stage STn is described as an example, but the remaining stages may be configured similarly to the n-th stage STn.

In embodiments, transistors included in the n-th stage STn may be oxide semiconductor transistors. The transistors may have a semiconductor layer including an oxide semiconductor.

The voltage-charging portion SST1 may control a voltage of a first output control node CQS[n] in response to the carry signal CR[n−1] of the (n−1)-th stage ST(n−1) supplied to the first carry input terminal CRIN1. However, the first stage ST1 may receive the scan start signal FLM instead of the carry signal of the previous stage. The first stage ST1 may control a voltage of a first output control node of the first stage ST1 in response to the scan start signal FLM.

The voltage of the first output control node CQS[n] may be a voltage for controlling the output of the first to sixth scan signals SC1[*n*] to SC6[*n*]. For example, the voltage of the first output control node CQS[n] may be a voltage for controlling a pull-up of the first to sixth scan signals SC1[*n*] to SC6[*n*].

The voltage-charging portion SST1 is connected to the first power line PL1, and may provide the first power voltage VGH1 of the first power line PL1 to the first output control node CQS[n] in response to the (n−1)-th carry signal CR[n−1]. For example, the voltage-charging portion SST1 may use a turn-on voltage of the (n−1)-th carry signal CR[n−1] to charge the voltage of the first output control node CQS[n].

The voltage-charging portion SST1 may control the voltage of the first output control node CQS[n] in response to a voltage of a second output control node BCR[n]. The voltage-charging portion SST1 is connected to the second power line PL2, and may provide the second power voltage VGH2 of the second power line PL2 to the first output control node CQS[n] in response to the voltage of the second output control node BCR[n]. For example, the voltage-charging portion SST1 may use a turn-on voltage of the second output control node BCR[n] to maintain the voltage of the first output control node CQS[n].

The voltage-charging portion SST1 may include a first transistor TR1 connected between the first power line PL1 and the first output control node CQS[n]. The first transistor TR1 may have a first electrode connected to the first power line PL1, a second electrode connected to the first output control node CQS[n], and a gate electrode connected to the (n−1)-th carry line CRL[n−1]. The gate electrode of the first transistor TR1 may be connected to the (n−1)-th carry line CRL[n−1] to which the carry signal CR[n−1] of the (n−1)-th stage ST(n−1) is input.

The voltage-charging portion SST1 may include a second transistor TR2 connected between the second power line PL2 and the first output control node CQS[n]. The second transistor TR2 may have a first electrode connected to the second power line PL2, a second electrode connected to the first output control node CQS[n], and a gate electrode connected to the second output control node BCR[n]. The gate electrode of the second transistor TR2 may be connected to the second output control node BCR[n] to which the first boosting clock signal BCK1 is input in response to a voltage of a first node CQ[n]. In FIG. 5, the first boosting clock signal BCK1 is illustrated as being input to the boosting controller SST5, but the second boosting clock signal BCK2 (see FIG. 3) may be input depending on a stage. The voltage-charging portion SST1 may include a first capacitor C1 connected between the first power line PL1 and the first output control node CQS[n].

According to one or more embodiments, the first power voltage VGH1 may be applied to the first output control node CQS[n] in response to the carry signal CR[n−1] of the (n−1)-th stage ST(n−1) before the second power voltage VGH2 is applied. Accordingly, the first output control node CQS[n] may be charged with the first power voltage VGH1, which is higher than the second power voltage VGH2. Depending on the first power voltage VGH1 transferred to the first output control node CQS[n], a fifth transistor TR5 may be stably turned on, and accordingly, the voltage of the first node CQ[n] may be effectively transferred to a third node Q[n]. This may mean that a voltage of the third node Q[n] is controlled with high reliability. Consequently, as described below, a sixth transistor TR6 outputs a scan signal in response to the voltage of the third node Q[n], so that the scan signal may be controlled with improved reliability.

The voltage reset portion SST2 may control the voltage of the first output control node CQS[n] in response to the voltage of the second node QB[n] of the n-th stage (or the current stage) and the voltage of a second node QB[n+1] of the (n+1)-th stage (or the next stage). According to one or more embodiments, the voltage reset portion SST2 may provide the third power voltage VGL1 of the third power line PL3 to the first output control node CQS[n] in response to the voltage of the second node QB[n] of the n-th stage and the voltage of the second node QB[n+1] of the (n+1)-th stage. For example, the voltage reset portion SST2 may discharge and thereby reset the voltage of the first output control node CQS[n].

The voltage reset portion SST2 may include a plurality of transistors connected in series between the first output control node CQS[n] and the third power line PL3. In one or more embodiments, the voltage reset portion SST2 may include third transistors TR3 and a fourth transistor TR4 connected in series between the first output control node CQS[n] and the third power line PL3.

The third transistors TR3 may be connected between the first output control node CQS[n] and the fourth transistor TR4. Gate electrodes of the third transistors TR3 may be connected to the second node QB[n] of the n-th stage. The third transistors TR3 may include a (3_1)-th transistor TR3_1 and a (3_2)-th transistor TR3_2 connected in series. A gate electrode of the (3_1)-th transistor TR3_1 and a gate electrode of the (3_2)-th transistor TR3_2 may be connected in common to the second node QB[n] of the n-th stage. However, embodiments are not limited thereto. For example, the third transistor TR3 may be a single transistor, and the gate electrode of the third transistor TR3 as the single transistor may be connected to the second node QB[n].

The fourth transistor TR4 may be connected between the third transistors TR3 and the third power line PL3. A gate electrode of the fourth transistor TR4 may be connected to the second node QB[n+1] of the (n+1)-th stage.

In the voltage reset portion SST2, the third transistors TR3 and the fourth transistor TR4 may be turned on when the second node QB[n] of the n-th stage and the second node QB[n+1] of the (n+1)-th stage both have a turn-on voltage. Accordingly, the voltage of the first output control node CQS[n] may be reset by discharging the voltage of the first output control node CQS[n] to the third power voltage VGL1 of the third power line PL3. Further, the voltage reset portion SST2 may hold the voltage of the first output control node CQS[n] without current leakage when at least one of the second node QB[n] of the n-th stage or the second node QB[n+1] of the (n+1)-th stage has a turn-off voltage.

The scan signal output portions SST3 may include first to sixth scan signal output portions SST3_1 to SST3_6. The scan signal output portions SST3 may output the scan signals SC1[n] to SC6[n] in response to the voltage of the first output control node CQS[n].

The first scan signal output portion SST3_1 may be connected to the first scan clock line SKL1 and the first scan line SL1[n]. For example, the first scan signal output portion SST3_1 may output the first scan clock signal SCK1 of the first scan clock line SKL1 as the first scan signal SC1[n] in response to the voltage of the first output control node CQS[n] and the voltage of the first node CQ[n].

The first scan signal output portion SST3_1 may include the fifth and sixth transistors TR5 and TR6, and a second capacitor C2. Further, the first scan signal output portion SST3_1 may include a seventh transistor TR7.

The fifth transistor TR5 may be connected between the first node CQ[n] and the third node Q[n]. A gate electrode of the fifth transistor TR5 may be connected to the first output control node CQS[n]. The fifth transistor TR5 may provide a turn-on voltage to the sixth transistor TR6 in response to the voltage of the first output control node CQS[n]. The fifth transistor TR5 may provide the voltage of the first node CQ[n] to a gate electrode of the sixth transistor TR6 in response to the voltage of the first output control node CQS[n]. For example, the fifth transistor TR5 may function as a pull-up buffer.

The first node CQ[n] may receive the first power voltage VGH1, which is higher than the second power voltage VGH2, via a 13th transistor TR13 according to the carry signal CR[n−1]. Further, the voltage-charging portion SST1 may transfer the first power voltage VGH1 to the first output control node CQS[n] in response to the carry signal CR[n−1] of the (n−1)-th stage ST(n−1). According to the first power voltage VGH1 transferred to the first output control node CQS[n], the fifth transistor TR5 may be stably turned on. Accordingly, the relatively high voltage of the first node CQ[n] may be stably transferred to the third node Q[n] via the fifth transistor TR5.

Further, because the fifth transistor TR5 is provided between the first node CQ[n] and the third node Q[n], the voltage of the first node CQ[n] may not be affected by the outputs of the first to sixth scan signals SC1[n] to SC6[n]. Accordingly, the first node CQ[n] and the first output control node CQS[n] may be controlled to desired voltage levels, and the first to sixth scan signals SC1[n] to SC6[n] may be output at desired voltage levels at a desired timing. For example, the first to sixth scan signals SC1[n] to SC6[n] may have the same voltage level. For example, the time taken for the voltage of each scan signal to rise and fall may be the same for each other. Accordingly, the deviation between the first to sixth scan signals SC1[n] to SC6[n] may not occur, or may be minimal or de minimis, and thus, horizontal line defects caused by luminance difference between rows of pixels of the display panel DP (see FIG. 1) may be prevented or mitigated.

The sixth transistor TR6 may be connected between the first scan clock line SKL1 and the first scan line SL1[n]. The gate electrode of the sixth transistor TR6 may be connected to the third node Q[n]. The sixth transistor TR6 may output the first scan signal SC1[n] corresponding to the first scan clock signal SCK1 to the first scan line SL1[n] in response to the voltage of the third node Q[n].

The second capacitor C2 may be connected between the third node Q[n] and the second output control node BCR[n]. The second capacitor C2 may be a boosting capacitor. When the fifth transistor TR5 is in a turn-off state, the voltage rise of the second output control node BCR[n] may raise the voltage of the third node Q[n] by the coupling of the second capacitor C2. Accordingly, the sixth transistor TR6 may stably maintain a turn-on state for a period (e.g., a predetermined period).

The seventh transistor TR7 may be connected between the first scan line SL1[n] and the third power line PL3. A gate electrode of the seventh transistor TR7 may be connected to the second node QB[n]. The seventh transistor TR7 may provide a turn-on voltage to the sixth transistor TR6 in response to the voltage of the second node QB[n]. The seventh transistor TR7 may output the third power voltage VGL1 of the third power line PL3 to the first scan line SL1[n] in response to the voltage of the second node QB[n].

Each of the second to sixth scan signal output portions SST3_2 to SST3_6 may be configured similarly to the first scan signal output portion SST3_1. Repetitive descriptions thereof are omitted.

The carry signal output portion SST4 may be connected between the carry clock line CKL and the fourth power line PL4. The carry signal output portion SST4 may output the first carry clock signal CRK1 of the carry clock line CKL to the carry line CRL[n] of the n-th stage STn in response to the voltage of the first node CQ[n]. The carry signal output portion SST4 may output the fourth power voltage VGL2 of the fourth power line PL4 to the carry line CRL[n] of the n-th stage STn in response to the voltage of the second node QB[n].

The carry signal output portion SST4 may include 10th and 11th transistors TR10 and TR11.

The 10th transistor TR10 may have a first electrode connected to the carry clock line CKL, a second electrode connected to the carry line CRL[n], and a gate electrode connected to the first node CQ[n]. The 10th transistor TR10 may provide the first carry clock signal CRK1 to the carry line CRL[n] in response to the voltage of the first node CQ[n]. However, although it is illustrated in FIG. 5 that the first carry clock signal CRK1 is provided, the second carry clock signal CRK2 (see FIG. 3) may be provided depending on a stage.

The 11th transistor TR11 may have a first electrode connected to the carry line CRL[n], a second electrode connected to the fourth power line PL4, and a gate electrode connected to the second node QB[n]. The 11th transistor TR11 may provide the fourth power voltage VGL2 to the carry line CRL[n] in response to the voltage of the second node QB[n]. The carry line CRL[n] connected to the 10th and 11th transistors TR10 and TR11 may be connected to the (n−1)-th stage ST(n−1) and the (n+1)-th stage ST(n+1).

The boosting controller SST5 may transfer the first boosting clock signal BCK1 to the second output control node BCR[n] in response to the voltage of the first node CQ[n]. The first boosting clock signal BCK1 transferred to the second output control node BCR[n] may turn off the second transistor TR2 to float the first output control node CQS[n]. The first boosting clock signal BCK1 transferred to the second output control node BCR[n] may raise the voltage level of the first node CQ[n] by the coupling of a third capacitor C3. Further, the first boosting clock signal BCK1 transferred to the second output control node BCR[n] may raise the voltage level of the third node Q[n] by the coupling of the second capacitor C2. However, the capacitance of the third capacitor C3 that raises the voltage level of the first node CQ[n] may be relatively large compared to the capacitance of the second capacitor C2 that raises the voltage level of the third node Q[n].

The boosting controller SST5 may include an eighth transistor TR8 and the third capacitor C3. Further, the boosting controller SST5 may include a ninth transistor TR9.

The eighth transistor TR8 may be connected between the boosting clock line BKL and the second output control node BCR[n]. A gate electrode of the eighth transistor TR8 may be connected to the first node CQ[n].

The ninth transistor TR9 may be connected between the second output control node BCR[n] and the fourth power line PL4. A gate electrode of the ninth transistor TR9 may be connected to the second node QB[n].

The third capacitor C3 may be connected between the first node CQ[n] and the second output control node BCR[n]. The third capacitor C3 may be connected between the gate electrode of the eighth transistor TR8 and the second output control node BCR[n]. The third capacitor C3 may be a boosting capacitor. When the first boosting clock signal BCK1 is transferred to the second output control node BCR[n] via the eighth transistor TR8, the voltage rise of the second output control node BCR[n] may raise the voltage of the first node CQ[n] by the coupling of the third capacitor C3. The voltage of the first node CQ[n] may be transferred to the third node Q[n] via the fifth transistor TR5 to raise the voltage of the third node Q[n].

The first node controller SST6 may control the voltage of the first node CQ[n] in response to the carry signal CR[n−1] of the (n−1)-th stage ST(n−1) and the carry signal CR[n+1] of the (n+1)-th stage ST(n+1).

The first node controller SST6 may include a 12th transistor TR12 connected between the first power line PL1 and the (n−1)-th carry line CRL[n−1], and a 13th transistor TR13 connected between the first power line PL1 and the first node CQ[n]. Gate electrodes of the 12th and 13th transistors TR12 and TR13 may be connected to the (n−1)-th carry line CRL[n−1]. For example, the 13th transistor TR13 may provide the first power voltage VGH1 to the first node CQ[n] in response to the carry signal CR[n−1] of the (n−1)-th stage ST(n−1).

The first node controller SST6 may include 14th and 15th transistors TR14 and TR15 connected between the fourth power line PL4 and the first node CQ[n]. Gate electrodes of the 14th transistors TR14 may be connected to the (n+1)-th carry line CRL[n+1]. The 14th transistors TR14 may include a (14_1)-th transistor TR14_1 and a (14_2)-th transistor TR14_2 connected in series. A gate electrode of the (14_1)-th transistor TR14_1 and a gate electrode of the (14_2)-th transistor TR14_2 may be connected in common to the (n+1)-th carry line CRL[n+1]. For example, the 14th transistors TR14 may provide the fourth power voltage VGL2 to the first node CQ[n] in response to the carry signal CR[n+1] of the (n+1)-th stage ST(n+1).

Gate electrodes of the 15th transistors TR15 may be connected to the second node QB[n]. The 15th transistors TR15 may include a (15_1)-th transistor TR15_1 and a (15_2)-th transistor TR15_2 connected in series. A gate electrode of the (15_1)-th transistor TR15_1 and a gate electrode of the (15_2)-th transistor TR15_2 may be connected in common to the second node QB[n]. For example, the 15th transistors TR15 may provide the fourth power voltage VGL2 to the first node CQ[n] in response to the voltage of the second node QB[n].

The second node controller SST7 may control the voltage of the second node QB[n] in response to the second power voltage VGH2 of the second power line PL2 and the voltage of the first node CQ[n].

The second node controller SST7 may include 16th and 17th transistors TR16 and TR17 connected between the second power line PL2 and the third power line PL3. Gate electrodes of the 16th transistors TR16 may be connected to the second power line PL2. The 16th transistors TR16 may include a (16_1)-th transistor TR16_1 and a (16_2)-th transistor TR16_2 connected in series. A gate electrode of the (16_1)-th transistor TR16_1 and a gate electrode of the (16_2)-th transistor TR16_2 may be connected in common to the second power line PL2. For example, the 16th transistors TR16 may provide the second power voltage VGH2 to a first voltage node N1 in response to the second power voltage VGH2 of the second power line PL2. Gate electrodes of the 17th transistors TR17 may be connected to the first node CQ[n]. For example, the 17th transistors TR17 may provide the third power voltage VGL1 to the first voltage node N1 in response to the voltage of the first node CQ[n].

The second node controller SST7 may include 18th and 19th transistors TR18 and TR19 connected between the second power line PL2 and the fourth power line PL4. A gate electrode of the 18th transistor TR18 may be connected to the first voltage node N1. For example, the 18th transistor TR18 may provide the second power voltage VGH2 to the second node QB[n] in response to a voltage of the first voltage node N1. Gate electrodes of the 19th transistor TR19 may be connected to the first node CQ[n]. For example, the 19th transistor TR19 may provide the fourth power voltage VGL2 to the second node QB[n] in response to the voltage of the first node CQ[n].

The second node controller SST7 may control the voltages of the first node CQ[n] and the second node QB[n]. For example, the second node controller SST7 may control the voltages of the first node CQ[n] and the second node QB[n] to be in opposite phases with each other.

Figure 6:
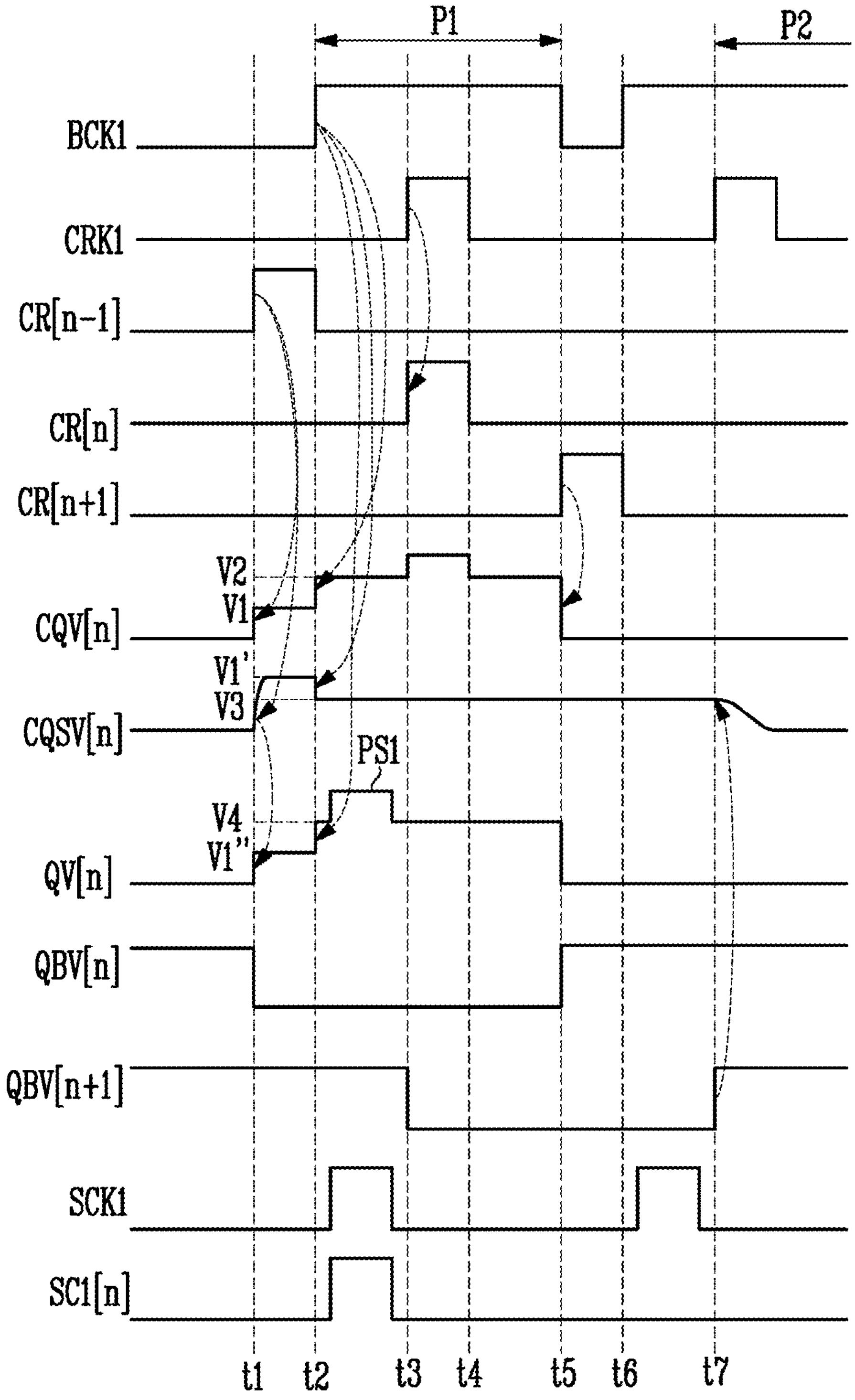
FIGS. 6 and 7 are timing diagrams illustrating one or more embodiments of an operation of the stage of FIG. 5.
Figure 7:
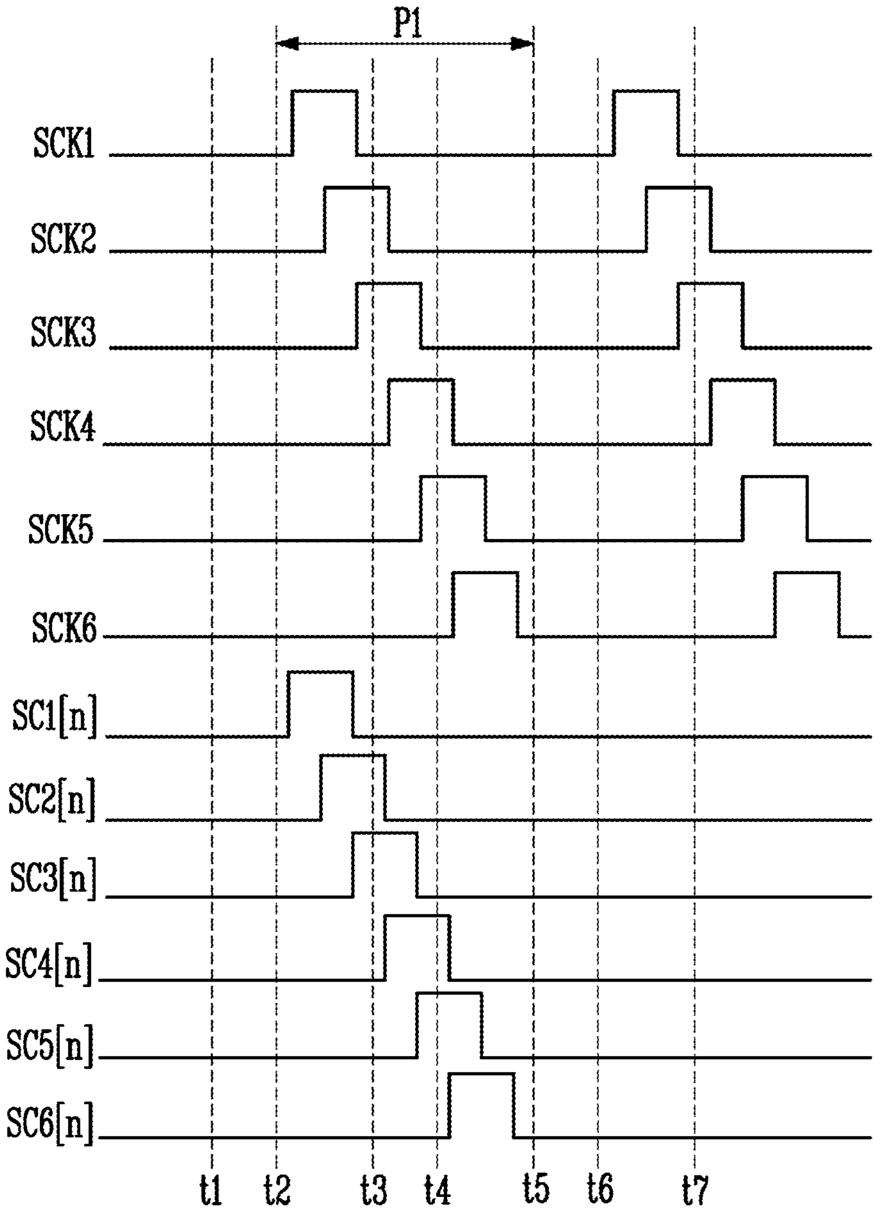

FIGS. 6 and 7 are timing diagrams illustrating one or more embodiments of an operation of the stage of FIG. 5.

FIGS. 5 to 7 illustrate signals applied to the boosting clock line BKL, the carry clock line CKL, the (n−1)-th to (n+1)-th carry lines CRL[n−1] to CRL[n+1], the first node CQ[n], the first output control node CQS[n], the third node Q[n], the second node QB[n] of the n-th stage STn, the second node QB[n+1] of the (n+1)-th stage ST(n+1), the first to sixth scan clock lines SKL1 to SKL6, and the first to sixth scan lines SL1[*n*] to SL6[*n*]. Hereinafter, an operation of the n-th stage STn in a display period is described. For clarity and brevity, the operation of the n-th stage STn is described as an example, but the remaining stages may operate similarly to the n-th stage STn.

At a first time point t1, the (n−1)-th carry signal CR[n−1] on the (n−1)-th carry line CRL[n−1] may transition to a high-level voltage. The 13th transistor TR13 may be turned on in response to the (n−1)-th carry signal CR[n−1], and the first power voltage VGH1 may be transferred to the first node CQ[n]. Accordingly, a voltage CQV[n] of the first node CQ[n] may have a first voltage level V1. For example, the first voltage level V1 may be approximately, but not limited to, 25 V.

The first transistor TR1 may be turned on in response to the (n−1)-th carry signal CR[n−1], and the first power voltage VGH1 may be transferred to the first output control node CQS[n]. Accordingly, a voltage CQSV[n] of the first output control node CQS[n] may have a first voltage level V1'.

The fifth transistor TR5 may be turned on in response to the voltage CQSV[n] of the first output control node CQS [n], and the voltage of the first node CQ[n] may be transferred to the third node Q[n]. Accordingly, a voltage QV[n] of the third node Q[n] may vary to the first voltage level V1". In FIG. 6, the voltage QV[n] of the third node Q[n] of one of the first to sixth scan signal output portions SST3_1 to SST3_6 is shown for clarity and brevity, and the voltages of the third nodes Q[n] of the remaining scan signal output portions are omitted. For example, in FIG. 6, the voltage QV[n] of the third node Q[n] of the first scan signal output portion SST3_1 is shown.

As the first power voltage VGH1 is transferred to the first node CQ[n], the 19th transistor TR19 may be turned on. Through the turned-on 19th transistor TR19, the fourth power voltage VGL2 may be transferred to the second node QB[n]. The voltage QBV[n] of the second node QB[n] may vary to a low level in response to the fourth power voltage VGL2. The third transistors TR3 may be turned off in response to the voltage QBV[n] of the second node QB[n], and the first output control node CQS[n] may be electrically isolated from the third power voltage VGL1.

At a second time point t2, the first boosting clock signal BCK1 applied to the boosting clock line BKL may transition to a high-level voltage. The eighth transistor TR8 is turned on in response to the voltage CQV[n] of the first node CQ[n], so that the high-level first boosting clock signal BCK1 may be transferred to the second output control node BCR[n] through the turned-on eighth transistor TR8. The high-level voltage applied to the second output control node BCR[n] may raise the voltage CQV[n] of the first node CQ[n] by the third capacitor C3 connected between the second output control node BCR[n] and the first node CQ[n]. Accordingly, at the second time point t2, the voltage CQV[n] of the first node CQ[n] may have a second voltage level V2 that is approximately twice as high as the first voltage level V1. The high-level voltage applied to the second output control node BCR[n] may raise the voltage QV[n] of the third node Q[n] by the second capacitor C2 connected between the second output control node BCR[n] and the third node Q[n]. Accordingly, at the second time point t2, the voltage QV[n] of the third node Q[n] may have a fourth voltage level V4 that is approximately twice as high as the first voltage level V1".

At the second time point t2, the second transistor TR2 may be turned on in response to the voltage of the second output control node BCR[n]. Through the turned-on second transistor TR2, the second power voltage VGH2 may be transferred to the voltage CQSV[n] of the first output control node CQS[n]. The voltage CQSV[n] of the first output control node CQS[n] may step down from the first power voltage VGH1 to the second power voltage VGH2. For example, the voltage CQSV[n] of the first output control node CQS[n] may change to a third voltage level V3. The third voltage level V3 may be approximately, but not limited to, 15 V. The voltage of the first output control node CQS[n] may be applied to the gate electrode of the fifth transistor TR5 connected between the first node CQ[n] and the third node Q[n]. For example, the fifth transistor TR5 may be turned off as the third voltage level V3 is applied to the gate electrode, and as the second voltage level V2 that is higher than the third voltage level V3 is applied to a source electrode. In other words, as the fifth transistor TR5 is turned off, the first node CQ[n] and the third node Q[n] may be electrically isolated. As a result, the deviation between the first to sixth scan signals SC1[*n*] to SC6[*n*] described hereinafter may not occur.

At the second time point t2, the (n−1)-th carry signal CR[n−1] may transition to a low-level voltage. Because the first output control node CQS[n] is connected to the first power line PL1 through the first capacitor C1, the voltage CQSV[n] of the first output control node CQS[n] may be maintained even if the first transistor TR1 is turned off.

At a third time point t3, the first carry clock signal CRK1 of the carry clock line CKL may transition to a high-level voltage. Because the 10th transistor TR10 is turned on in response to the voltage CQV[n] of the first node CQ[n], the high-level first carry clock signal CRK1 may be transferred to the n-th carry line CRL[n]. Accordingly, at the third time point t3, the first carry clock signal CRK1 is output to the n-th carry line CRL[n], and therefore the n-th carry signal CR[n] may have a high-level voltage.

At the third time point t3, the first carry clock signal CRK1 at the level applied to the n-th carry line CRL[n] may raise the voltage CQV[n] of the first node CQ[n] by the 10th transistor TR10 connected between the n-th carry line CRL [n] and the first node CQ[n]. Accordingly, at the third time point t3, the voltage CQV[n] of the first node CQ[n] may have a voltage level that is higher than the second voltage level V2.

At the third time point t3, the voltage QBV[n+1] applied from the second node QB[n+1] of the (n+1)-th stage ST(n+1) may have a low-level voltage. The fourth transistor TR4 may be turned off in response to the voltage QBV[n+1], and the first output control node CQS[n] may be electrically isolated from the third power voltage VGL1.

At a fourth time point t4, the first carry clock signal CRK1 on the carry clock line CKL may transition to a low-level voltage. Accordingly, at the fourth time point t4, the n-th carry signal CR[n] may have a low-level voltage.

At a fifth time point t5, the first boosting clock signal BCK1 applied to the boosting clock line BKL may transition to a low-level voltage. The (n+1)-th carry signal CR[n+1] applied to the (n+1)-th carry line CRL[n+1] may have a high-level voltage. The 14th transistor TR14 may be turned on in response to the (n+1)-th carry signal CR[n+1], and the fourth power voltage VGL2 may be transferred to the first node CQ[n]. Accordingly, the voltage CQV[n] of the first node CQ[n] and the voltage QV[n] of the third node Q[n] may be reduced.

According to one or more embodiments, in a first period P1 from the second time point t2 to the fifth time point t5, the first boosting clock signal BCK1 may have a voltage of a high level. The first period P1 may be a period in which the fifth transistor TR5 is turned off as the voltage CQSV[n] of the first output control node CQS[n] has a lower level than the voltage CQV[n] of the first node CQ[n]. Also, the first period P1 may be a period in which the sixth transistor TR6 is turned on in response to the voltage QV[n] of the third node Q[n]. The voltage QV[n] of the third node Q[n] may be a voltage of the second output control node BCR[n] which is transferred through the second capacitor C2.

Referring to FIGS. 5 and 7, the first to sixth scan clock signals SCK1 to SCK6 applied to the first to sixth scan clock lines SKL1 to SKL6 may be pulses having low-level and high-level voltages. The phase of the second scan clock signal SCK2 may be delayed from the first scan clock signal SCK1. The voltage of the high level of the second scan clock signal SCK2 may have the phase delayed from the voltage of the high level of the first scan clock signal SCK1, but may partially overlap with the voltage of the high level of the first scan clock signal SCK1. The phase of the third scan clock signal SCK3 may be delayed from the second scan clock signal SCK2. The voltage of the high level of the third scan clock signal SCK3 may have the phase delayed from the voltage of the high level of the second scan clock signal SCK2, but may partially overlap with the voltage of the high level of the second scan clock signal SCK2. The phase of the fourth scan clock signal SCK4 may be delayed from the third scan clock signal SCK3. The voltage of the high level of the fourth scan clock signal SCK4 may have the phase delayed from the voltage of the high level of the third scan clock signal SCK3, but may partially overlap with the voltage of the high level of the third scan clock signal SCK3. The phase of the fifth scan clock signal SCK5 may be delayed from the fourth scan clock signal SCK4. The voltage of the high level of the fifth scan clock signal SCK5 may have the phase delayed from the voltage of the high level of the fourth scan clock signal SCK4, but may partially overlap with the voltage of the high level of the fourth scan clock signal SCK4. The phase of the sixth scan clock signal SCK6 may be delayed from the fifth scan clock signal SCK5. The voltage of the high level of the sixth scan clock signal SCK6 may have the phase delayed from the voltage of the high level of the fifth scan clock signal SCK5, but may partially overlap with the voltage of the high level of the fifth scan clock signal SCK5.

In the first period P1, the voltage QV[n] of the third node Q[n] may have the fourth voltage level V4 (see FIG. 6). As such, the sixth transistors TR6 of the first to sixth scan signal output portions SST3_1 to SST3_6 may be turned on according to the voltages of the third nodes Q[n] of the first to sixth scan signal output portions SST3_1 to SST3_6. Accordingly, the first to sixth scan clock signals SCK1 to SCK6 may be output to the first to sixth scan lines SL1[*n*] to SL6[*n*] as the first to sixth scan signals SC1[*n*] to SC6[*n*]. Depending on the first to sixth scan clock signals SCK1 to SCK6, each of the first to sixth scan signals SC1[*n*] to SC6[*n*] may have a phase delayed from a previous scan signal, but may partially overlap with the previous scan signal.

In the first period P1, whenever each scan clock signal is output as a scan signal, the voltage of the third node Q[n] of a corresponding scan signal output portion may fluctuate unintentionally. For example, due to the coupling of a parasitic capacitor that may be formed between a drain electrode and the gate electrode of the sixth transistor TR6, or due to the coupling of a parasitic capacitor that may be formed between a source electrode and the gate electrode of the sixth transistor TR6, a voltage of the scan signal may affect the voltage of the third node Q[n]. Accordingly, in one or more embodiments, a first pulse PS1 may appear at the voltage of the third node Q[n] of the first scan signal output portion SST3_1 (e.g., the first pulse PS1 may appear at the same time as the first scan clock signal SCK1 and the first scan signal SC1[*n*]).

On the other hand, because the first node CQ[n] is connected to the third node Q[n] via the fifth transistor TR5, the first node CQ[n] may have a relatively stable voltage when the scan clock signal of the corresponding scan signal output portion is output as the scan signal. Therefore, even when the voltage of the third node Q[n] of one of the first to sixth scan signal output portions SST3_1 to SST3_6 fluctuates due to the output of the scan signal, the voltage of the third node Q[n] of the other scan signal output portions other than the one scan signal output portion may receive the stable voltage of the first node CQ[n]. As described above, the output of each scan signal might not affect the output of another scan signal. Accordingly, the first to sixth scan signals SC1[*n*] to SC6[*n*] may be output at desired voltage levels at desired timings. For example, the first to sixth scan signals SC1[*n*] to SC6[*n*] may have the same voltage level. For example, the time taken for the voltage of each scan signal to rise and fall may be the same for each other. Accordingly, the deviation between the first to sixth scan signals SC1[*n*] to SC6[*n*] might not occur, and thus, horizontal line defects caused by luminance difference between rows of pixels of the display panel DP (see FIG. 1) may be prevented or mitigated.

Referring again to FIG. 6, at a sixth time point t6, the first boosting clock signal BCK1 applied to the boosting clock line BKL may transition to a voltage of a high level. The (n+1)-th carry signal CR[n+1] applied to the (n+1)-th carry line CRL[n+1] may transition to a voltage of a low level.

At a seventh time point t7, the voltage QBV[n+1] applied from the second node QB[n+1] of the (n+1)-th stage ST(n+1) may transition to a voltage of a high level. The voltage QBV[n] applied to the second node QB[n] of the n-th stage STn may have a voltage of a high level from the fifth time point t5. The third transistors TR3 may be turned on in response to the voltage QBV[n] of the second node QB[n], and the fourth transistor TR4 may be turned on in response to the voltage QBV[n+1] of the second node QB[n+1] of the (n+1)-th stage ST(n+1). The time period after the seventh time point t7 may be defined as a second period P2. In the second period P2, the voltage CQSV[n] of the first output control node CQS[n] may be discharged to the third power voltage VGL1 via the turned-on third and fourth transistors TR3 and TR4. The voltage CQSV[n] of the first output control node CQS[n] may have the third power voltage VGL1. As the voltage CQSV[n] of the first output control node CQS[n] has the third power voltage VGL1, degradation of transistors connected to the first output control node CQS[n] may be prevented or mitigated. For example, degradation of the fifth transistor TR5 may be prevented or mitigated.

Figure 8:
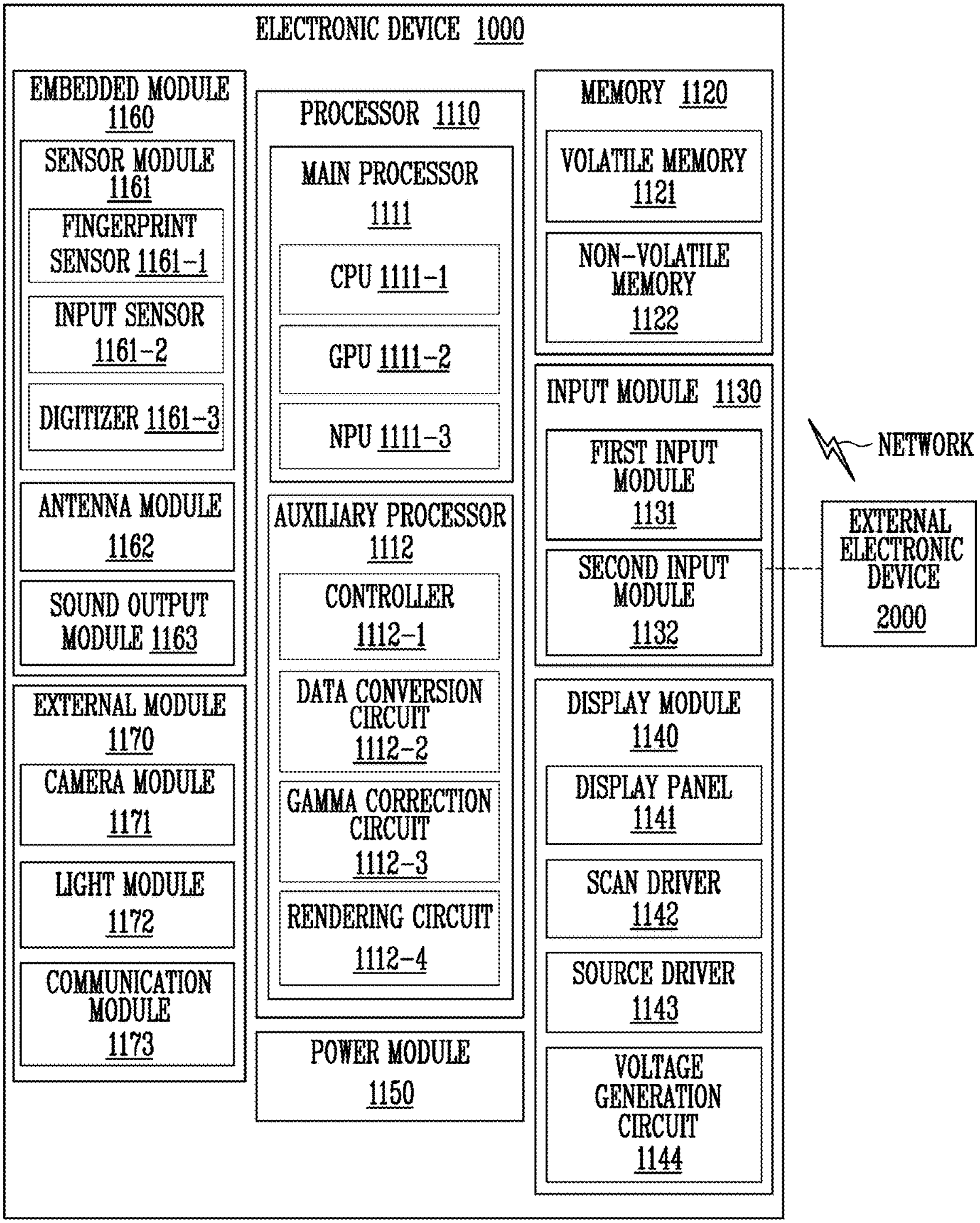
FIG. 8 is a schematic block diagram illustrating one or more embodiments of an electronic device including a scan driver according to one or more embodiments of the present disclosure.

FIG. 8 is a schematic block diagram illustrating one or more embodiments of an electronic device 1000 including a scan driver 1142 according to one or more embodiments of the present disclosure.

Referring to FIG. 8, the electronic device 1000 of one or more embodiments of the present disclosure may output various information via a display module 1140. When a processor 1110 executes an application stored in a memory 1120, the display module 1140 may provide application information to a user through a display panel 1141.

The processor 1110 may acquire an external input through an input module 1130 or a sensor module 1161, and execute an application corresponding to the external input. For example, when the user selects a camera icon (or a camera application icon) displayed on the display panel 1141, the processor 1110 acquires a user input through an input sensor 1161-2 and activates a camera module 1171. The processor 1110 may transfer image data corresponding to a captured image acquired through the camera module 1171 to the display module 1140. The display module 1140 may display an image corresponding to the captured image through the display panel 1141.

As another example, when personal information authentication is executed in the display module 1140, a fingerprint sensor 1161-1 may acquire input fingerprint information as input data. The processor 1110 may compare the input data acquired through the fingerprint sensor 1161-1 with the authentication data stored in the memory 1120, and execute an application according to the comparison result. The display module 1140 may display information executed according to the logic of the application through the display panel 1141. The fingerprint sensor 1161-1 may be arranged to acquire fingerprint information in the entire area of the display module 1140 (or the display panel 1141).

As another example, when a music streaming icon displayed on the display module 1140 is selected, the processor 1110 may acquire the user input through the input sensor 1161-2 and activate a music streaming application stored in the memory 1120. When a music play command is input to the music streaming application, the processor 1110 may activate a sound output module 1163 to provide sound information corresponding to the music play command to the user.

Operations of the electronic device 1000 have been briefly described above. Components of the electronic device 1000 will be described in detail below. Some of the components of the electronic device 1000 described below may be integrated and provided as one component, or one component may be provided as two or more separate components.

The electronic device 1000 may communicate with an external electronic device 2000 through a network (e.g., a near field communication network or a far field communication network). According to one or more embodiments, the electronic device 1000 may include the processor 1110, the memory 1120, the input module 1130, the display module 1140, a power module 1150, an embedded module 1160, and an external module 1170. According to one or more embodiments, at least one of the above-described components of the electronic device 1000 may be omitted, or one or more other components may be added. According to one or more embodiments, some of the above-described components (e.g., the sensor module 1161, an antenna module 1162, or the sound output module 1163) may be integrated into another component (e.g., the display module 1140).

The processor 1110 may execute software to control one or more other components (e.g., a hardware or software component) of the electronic device 1000 that are connected to the processor 1110, and may perform various data processing or operations. According to one or more embodiments, as at least part of the data processing or operations, the processor 1110 may store commands or data received from another component (e.g., the input module 1130, the sensor module 1161, or a communication module 1173) in a volatile memory 1121, process the commands or data stored in the volatile memory 1211, and store the result data in a non-volatile memory 1122.

The processor 1110 may include a main processor 1111 and an auxiliary processor 1112. The main processor 1111 may include one or more of a central processing unit (CPU) 1111-1 or an application processor (AP). The main processor 1111 may further include one or more of a graphics processing unit (GPU) 1111-2, a communication processor (CP), or an image signal processor (ISP). The main processor 1111 may further include a neural processing unit (NPU) 1111-3. The NPU 1111-3 is a processor specialized in processing an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more of the above, but is not limited to the foregoing examples. The artificial intelligence model may include a software structure in addition to a hardware structure, or in general. Two or more of the foregoing processing units and processors may be implemented in one integrated component (e.g., a single chip), or each may be implemented in an independent component (e.g., a plurality of chips).

The auxiliary processor 1112 may include a controller 1112-1. The controller 1112-1 may include an interface conversion circuit and a timing control circuit. For example, the controller 1112-1 may include the controller 110 shown in FIG. 1. The controller 1112-1 may receive an image signal from the main processor 1111, convert a data format of the image signal to meet an interface specification of the display module 1140, and output the image data. The controller 1112-1 may output various control signals suitable for driving the display module 1140.

In one or more embodiments, the auxiliary processor 1112 may further include the data conversion circuit 1112-2, the gamma correction circuit 1112-3, the rendering circuit 1112-4, a touch control circuit, and the like. The data conversion circuit 1112-2 may receive image data from the controller 1112-1, and compensate for the image data so that an image is displayed at desired luminance according to the characteristics of the electronic device 1000 or the user's settings, or convert the image data to reduce power consumption or compensate for afterimages.

The gamma correction circuit 1112-3 may convert image data, a gamma reference voltage, or the like so that an image displayed on the electronic device 1000 has a desired gamma characteristic. The rendering circuit 1112-4 may receive the image data from the controller 1112-1 and render the image data in consideration of pixel arrangements or the like in the display panel 1141 applied to the electronic device 1000.

The touch control circuit may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, or the touch control circuit may be integrated into another component (e.g., the main processor 1111 or the controller 1112-1). At least one of the data conversion circuit 1112-2, the gamma correction circuit 1112-3, or the rendering circuit 1112-4 may be integrated into a source driver 1143 to be described below.

The memory 1120 may store various data used by at least one component of the electronic device 1000 (e.g., the processor 1110 or the sensor module 1161) and input data or output data for commands related thereto. In addition, various setting data corresponding to the user's settings may be stored in the memory 1120. The memory 1120 may include at least one of the volatile memory 1121 or the non-volatile memory 1122.

The input module 1130 may receive commands or data to be used for a component of the electronic device 1000 (e.g., the processor 1110, the sensor module 1161, or the sound output module 1163) from outside the electronic device 1000, such as the user or the external electronic device 2000.

The input module 1130 may include a first input module 1131 to which the user inputs commands or data, and a second input module 1132 to which the external electronic device 2000 inputs commands or data. The first input module 1131 may include a microphone, a mouse, a keyboard, a key (e.g., a button), or a pen (e.g., a passive pen or an active pen). The second input module 1132 may support a specified protocol which may be connected to the external electronic device 2000 by wire or wirelessly. According to one or more embodiments, the second input module 1132 may include a high definition multimedia interface (HDMI), a universal serial bus (USB) interface, a Secure Digital (SD) card interface, or an audio interface. The second input module 1132 may include a connector which may be physically connected to the external electronic device 2000, for example, an HDMI connector, a USB connector, an SD card connector, or an audio connector (e.g., a headphone connector).

The display module 1140 may provide information to the user visually. The display module 1140 may include the display panel 1141, the scan driver 1142, and the source driver 1143. The display module 1140 may further include a window, a chassis, and a bracket for protecting the display panel 1141.

The display panel 1141 (or a display) may include a liquid crystal display panel, an organic light-emitting display panel, or an inorganic light-emitting display panel. A type of the display panel 1141 is not particularly limited. The display panel 1141 may be of a rigid type or of a flexible type such as a rollable type or a foldable type. The display module 1140 may further include a supporter, a bracket, a heat dissipation layer, or the like supporting the display panel 1141.

The display panel 1141 may receive image data from the auxiliary processor 1112 and display an image while controlling the amount of a current supplied from a first driving power node VDDN to a second driving power node VSSN via the pixels PXL in response to the image data. The display panel 1141 may correspond to the display panel DP shown in FIG. 1.

The scan driver 1142 may be mounted on the display panel 1141 as a driving chip. In addition, the scan driver 1142 may be integrated into the display panel 1141. For example, the scan driver 1142 may include an Amorphous Silicon TFT Gate driver circuit (ASG), a Low-Temperature Polycrystalline Silicon (LTPS) TFT gate driver circuit, or an Oxide Semiconductor TFT Gate driver circuit (OSG) embedded in the display panel 1141. The scan driver 1142 may receive a control signal from the controller 1112-1 and output scan signals to the display panel 1141 in response to the control signal. The scan driver 1142 may include the scan driver 120 shown in FIG. 1.

The display module 1140 may further include an emission driver. The emission driver may output an emission control signal to the display panel 1141 in response to the control signal received from the controller 1112-1. The emission driver may be formed separately from the scan driver 1142, or may be integrated into the scan driver 1142.

The source driver 1143 may receive the control signal from the controller 1112-1, convert the image data into an analog voltage (e.g., a data signal) in response to the control signal, and output the data signal to the display panel 1141. The source driver 1143 may include the data driver 130 shown in FIG. 1.

The source driver 1143 may be integrated into another component (e.g., the controller 1112-1). Functions of the interface conversion circuit and the timing control circuit of the controller 1112-1 described above may be integrated into the source driver 1143.

The display module 1140 may further include a voltage generation circuit 1144. The voltage generation circuit 1144 may output various voltages required for driving the display panel 1141.

In one or more embodiments, the source driver 1143 may convert data corresponding to a red (R) color, a green (G) color, and a blue (B) color included in the image data received from the processor 1110 into a red data signal (or data voltage), a green data signal (or data voltage), and a blue data signal (or data voltage), respectively, and may provide the data signals to a plurality of pixel columns included in the display panel 1141 during one horizontal period.

The power module 1150 may supply power to the components of the electronic device 1000. The power module 1150 may include a battery which charges a power voltage. Examples of the battery may include a non-rechargeable primary battery, a rechargeable secondary battery, or a fuel cell. The power module 1150 may include a power management integrated circuit (PMIC). The PMIC may supply optimized power to each of the modules described above and modules to be described below. The power module 1150 may include a wireless power transmitting/receiving element electrically connected to the battery. The wireless power transmitting/receiving element may include a plurality of antenna radiators in the form of coils. The voltage generation circuit 1144 may be integrated into the power module 1150.

The electronic device 1000 may further include the embedded module 1160 and the external module 1170. The embedded module 1160 may include the sensor module 1161, the antenna module 1162, and the sound output module 1163. The external module 1170 may include the camera module 1171, a light module 1172, and the communication module 1173.

The sensor module 1161 may sense an input by the user's body or an input by the pen of the first input module 1131, and generate an electrical signal or data value corresponding to the input. The sensor module 1161 may include at least one of the fingerprint sensor 1161-1, the input sensor 1161-2, or a digitizer 1161-3.

The fingerprint sensor 1161-1 may generate a data value corresponding to the user's fingerprint. The fingerprint sensor 1161-1 may include either an optical or capacitive fingerprint sensor.

The input sensor 1161-2 may generate a data value corresponding to coordinate information of the input by the user's body or the input by the pen. The input sensor 1161-2 may generate the amount of change in capacitance due to the input as the data value. The input sensor 1161-2 may sense an input by the passive pen or transmit and receive data to and from the active pen.

The input sensor 1161-2 may measure biosignals such as blood pressure, moisture, or body fat. For example, when the user contacts a part of the body with a sensor layer or a sensing panel and does not move for a certain period of time, based on a change in an electric field caused by the part of the body, the input sensor 1161-2 may sense a biosignal and output information desired by the user to the display module 1140.

The digitizer 1161-3 may generate a data value corresponding to the coordinate information of the input by the pen. The digitizer 1161-3 may generate the amount of electromagnetic change by the input as the data value. The digitizer 1161-3 may sense the input by the passive pen or transmit and receive data to and from the active pen.

At least one of the fingerprint sensor 1161-1, the input sensor 1161-2, or the digitizer 1161-3 may be implemented as a sensor layer formed on the display panel 1141 through a continuous process. At least one of the fingerprint sensor 1161-1, the input sensor 1161-2, or the digitizer 1161-3 may be located above the display panel 1141, and one of the fingerprint sensor 1161-1, the input sensor 1161-2, or the digitizer 1161-3, for example, the digitizer 1161-3, may be located below the display panel 1141.

Two or more of the fingerprint sensor 1161-1, the input sensor 1161-2, or the digitizer 1161-3 may be formed to be integrated into one sensing panel through the same process. When integrated into one sensing panel, the sensing panel may be located between the display panel 1141 and a window located above the display panel 1141. According to one or more embodiments, the sensing panel may be located on the window, and the position of the sensing panel is not particularly limited.

At least one of the fingerprint sensor 1161-1, the input sensor 1161-2, or the digitizer 1161-3 may be embedded in the display panel 1141. For example, at least one of the fingerprint sensor 1161-1, the input sensor 1161-2, or the digitizer 1161-3 may be simultaneously formed through a process of forming devices (e.g., a light-emitting device, a transistor, or the like) included in the display panel 1141.

In addition, the sensor module 1161 may generate an electrical signal or data value corresponding to an internal state or an external state of the electronic device 1000. The sensor module 1161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting or receiving signals or power externally. According to one or more embodiments, the communication module 1173 may transmit a signal to or receive a signal from the external electronic device 2000 through an antenna suitable for a communication method. An antenna pattern of the antenna module 1162 may be integrated into one component (e.g., the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving phone. According to one or more embodiments, the receiver may be formed integrally with or separately from the speaker. A sound output pattern of the sound output module 1163 may be integrated into the display module 1140.

The camera module 1171 may capture still images and film videos. According to one or more embodiments, the camera module 1171 may include one or more lenses, image sensors, or image signal processors. The camera module 1171 may further include an infrared camera capable of measuring the presence or absence of the user, the position of the user, a gaze of the user, and the like.

The light module 1172 may provide light. The light module 1172 may include a light-emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include one or both of a wireless communication module such as a cellular communication module, a near field communication module, or a global navigation satellite system (GNSS) communication module, and a wired communication module such as a local area network (LAN) communication module or a power line communication module. The communication module 1173 may communicate with the external electronic device 2000 via a local area network such as Bluetooth® (Bluetooth® being a registered trademark of Bluetooth Sig, Inc., Kirkland, WA), Wi-Fi® direct (Wi-Fi® being a registered trademark of the non-profit Wi-Fi Alliance), or infrared data association (IrDA), or a long distance communication network such as a cellular network, the Internet, or a computer network (e.g., a LAN or a wide area network (WAN)). The various types of communication modules 1173 described above may be implemented as one chip or may be implemented as separate chips.

The input module 1130, the sensor module 1161, the camera module 1171, and the like may be utilized to control the operation of the display module 1140 in conjunction with the processor 1110.

The processor 1110 may output commands or data to the display module 1140, the sound output module 1163, the camera module 1171, or the light module 1172 based on input data received from the input module 1130. For example, the processor 1110 may generate image data in response to input data applied through a mouse, an active pen, or the like and output the image data to the display module 1140, or may generate command data in response to the input data and output the command data to the camera module 1171 or the light module 1172. When input data is not received from the input module 1130, the processor 1110 may switch an operation mode of the electronic device 1000 to a low power mode or a sleep mode to reduce power consumed by the electronic device 1000.

The processor 1110 may output commands or data to the display module 1140, the sound output module 1163, the camera module 1171, or the light module 1172 based on sensing data received from the sensor module 1161. For example, the processor 1110 may compare the authentication data applied by the fingerprint sensor 1161-1 with the authentication data stored in the memory 1120, and then execute an application according to the comparison result. The processor 1110 may execute a command or output corresponding image data to the display module 1140 based on the sensing data sensed by the input sensor 1161-2 or the digitizer 1161-3. When the sensor module 1161 includes a temperature sensor, the processor 1110 may receive temperature data for the measured temperature from the sensor module 1161, and further perform luminance correction or the like on the image data based on the temperature data.

The processor 1110 may receive measurement data on the presence or absence of the user, the position of the user, and the gaze of the user from the camera module 1171. The processor 1110 may further correct luminance of the image data based on the measurement data. For example, when the processor 1110 determines the presence or absence of the user through an input from the camera module 1171, the processor 1110 may output the image data of which luminance is corrected to the display module 1140 through the data conversion circuit 1112-2 or the gamma correction circuit 1112-3.

Some of the above components may be connected to each other through a communication method between peripheral devices, for example, a bus, a general purpose input/output (GPIO), a serial peripheral interface (SPI), a mobile industry processor interface (MIPI), or an ultra path interconnect (UPI) link and may exchange signals (e.g., commands or data) with each other. The processor 1110 may communicate with the display module 1140 through a mutually agreed interface, for example, one of the above-described communication methods may be used, but communication methods are not limited thereto.

In a scan driver and a display device including the scan driver according to embodiments of the present disclosure, the scan driver may include a plurality of stages, and by charging and maintaining a Common Qnode Switch (CQS) node of each of the stages at a high voltage level, the deviation of scan signals may be reduced. Thus, horizontal line defects caused by luminance difference between rows of pixels in the display device may be prevented or mitigated. Furthermore, by resetting a first output control node (or a Common Qnode Switch (CQS) node) of each of the stages by a voltage of the second node (or a QB node) of a current stage and a voltage of a QB node of a next stage, the deterioration of transistors may be prevented or mitigated.

Although certain embodiments and applications have been described herein, other embodiments and variations may be derived from the above description. Accordingly, the idea of the present disclosure is not limited to these embodiments, but extends to the patent claims set forth below, various obvious variations, and equivalents.

According to some embodiments of the present disclosure, a scan driver with improved reliability, a display device including the scan driver, and an electronic device including the scan driver are provided.

The aspects embodiments of the present disclosure are not limited by the aspects described above, and more various aspects are included in the present specification.

What is claimed is:

1. A scan driver comprising stages configured to output scan signals, wherein an n-th stage (n being an integer greater than 1) of the stages comprises:

a voltage-charging portion connected to a first power line and to a second power line, and configured to:

transfer a voltage of the first power line to a first output control node in response to a first carry signal from an (n−1)-th stage of the stages; and transfer a voltage of the second power line to the first output control node in response to a voltage of a second output control node;

a voltage reset portion comprising transistors connected in series between the first output control node and a third power line, and configured to reset a voltage of the first output control node; and scan signal output portions configured to output one or more of the scan signals in response to the voltage of the second output control node.

2. The scan driver according to claim 1, wherein the voltage-charging portion comprises:

a first transistor connected between the first power line and the first output control node, and having a gate electrode connected to a first carry line configured to receive the first carry signal;

a second transistor connected between the second power line and the first output control node, and having a gate electrode connected to the second output control node; and a first capacitor connected between the first power line and the first output control node.

3. The scan driver according to claim 1, wherein the transistors connected in series comprise:

a third transistor connected between the first output control node and the third power line, and having a gate electrode connected to a second node of the n-th stage;

and a fourth transistor connected between the third transistor and the third power line, and having a gate electrode connected to a second node of an (n+1)-th stage of the stages, and wherein the third and fourth transistors are configured to be turned on in response to a voltage of the second node of the n-th stage and a voltage of the second node of the (n+1)-th stage so that the first output control node has a voltage of the third power line.

4. The scan driver according to claim 1, wherein one of the scan signal output portions is connected to a scan clock line, and is configured to output a signal of the scan clock line as one of the scan signals according to the voltage of the second output control node.

5. The scan driver according to claim 1, wherein one of the scan signal output portions comprises:

a fifth transistor connected between a first node and a third node, and having a gate electrode connected to the first output control node;

a second capacitor connected between the third node and the second output control node;

a sixth transistor connected between a scan clock line and a scan line, and having a gate electrode connected to the third node; and a seventh transistor connected between the scan line and the third power line, and having a gate electrode connected to a second node of the n-th stage.

6. The scan driver according to claim 5, wherein the n-th stage further comprises an eighth transistor configured to transfer a boosting clock signal to the second output control node in response to a voltage of the first node to raise a voltage of the third node through the second capacitor.

7. The scan driver according to claim 1, wherein the n-th stage further comprises a boosting controller configured to transfer a boosting clock signal to the second output control node in response to a voltage of a first node, and to raise the voltage of the first node according to the boosting clock signal.

8. The scan driver according to claim 1, wherein the n-th stage comprises:

an eighth transistor connected between a boosting clock line and the second output control node, and having a gate electrode connected to a first node;

a third capacitor connected between the gate electrode of the eighth transistor and the second output control node; and a ninth transistor connected between the second output control node and a fourth power line, and having a gate electrode connected to a second node.

9. The scan driver according to claim 1, wherein the n-th stage further comprises a carry signal output portion connected between a carry clock line and a fourth power line, and configured to output a signal of the carry clock line as a second carry signal in response to a voltage of a first node, and to output a voltage of the fourth power line as the second carry signal in response to a voltage of a second node.

10. A scan driver, comprising stages configured to output scan signals, an n-th stage of the stages comprising:

a first transistor having a first electrode connected to a first power line, a second electrode connected to a first output control node, and a gate electrode connected to a first carry line connected to an (n−1)-th stage of the stages;

a second transistor having a first electrode connected to a second power line, a second electrode connected to the first output control node, and a gate electrode connected to a second output control node;

a first capacitor connected between the first power line and the first output control node;

transistors connected in series between the first output control node and a third power line; and scan signal output portions configured to output one or more of the scan signals in response to a voltage of the second output control node.

11. The scan driver according to claim 10, wherein a voltage of the first power line is higher than a voltage of the second power line.

12. The scan driver according to claim 10, wherein the n-th stage further comprises:

a 10th transistor having a first electrode connected to a carry clock line, a second electrode connected to a second carry line connected to the (n−1)-th stage and to an (n+1)-th stage of the stages, and a gate electrode connected to a first node; and an 11th transistor having a first electrode connected to the second carry line, a second electrode connected to a fourth power line, and a gate electrode connected to a second node.

13. The scan driver according to claim 10, wherein the transistors connected in series comprise:

a third transistor connected between the first output control node and the third power line, and having a gate electrode connected to a second node of the n-th stage; and a fourth transistor connected between the third transistor and the third power line, and having a gate electrode connected to a second node of an (n+1)-th stage of the stages, and wherein the third and fourth transistors are configured to be turned on in response to a voltage of the second node of the n-th stage and a voltage of the second node of the (n+1)-th stage so that a voltage of the first output control node has a voltage of the third power line.

14. The scan driver according to claim 10, wherein one of the scan signal output portions comprises:

a fifth transistor connected between a first node and a third node, and having a gate electrode connected to the first output control node;

a second capacitor connected between the third node and the second output control node;

a sixth transistor connected between a scan clock line and a scan line, and having a gate electrode connected to the third node; and a seventh transistor connected between the scan line and the third power line, and having a gate electrode connected to a second node of the n-th stage.

15. An electronic device, comprising:

a display panel comprising scan lines, and pixels connected to the scan lines;

a processor configured to provide input image data;

a controller configured to receive the input image data from the processor, and configured to drive the display panel; and a scan driver configured to supply scan signals to the display panel, and comprising stages configured to output the scan signals to the scan lines, an n-th stage of the stages comprising:

a voltage-charging portion connected to a first power line and a second power line, and configured to transfer a voltage of the first power line to a first output control node in response to a first carry signal from an (n−1)-th stage of the stages, and to transfer a voltage of the second power line to the first output control node in response to a voltage of a second output control node;

a voltage reset portion comprising transistors connected in series between the first output control node and a third power line, and configured to reset a voltage of the first output control node; and scan signal output portions configured to output one or more of the scan signals in response to the voltage of the second output control node.

16. The electronic device according to claim 15, wherein the voltage of the first output control node is configured to fluctuate by one of the first carry signal of the (n−1)-th stage, the voltage of the second output control node, and a voltage of a second node of an (n+1)-th stage of the stages.

17. The electronic device according to claim 15, wherein the voltage of the first power line is configured to be applied as the voltage of the first output control node, and the voltage of the second power line is configured to be applied as the voltage of the first output control node in response to the voltage of the second output control node.

18. The electronic device according to claim 15, wherein the voltage of the first output control node is configured to have a voltage of the third power line in response to a voltage of a second node of the n-th stage and a voltage of a second node of an (n+1)-th stage of the stages.

19. The electronic device according to claim 15, wherein the n-th stage is configured to transfer a boosting clock signal to the second output control node in response to a voltage of a first node, and is configured to raise the voltage of the first node according to the boosting clock signal transferred to the second output control node.

20. The electronic device according to claim 15, wherein a third node is configured to be electrically isolated from a first node according to the voltage of the first node and the voltage of the first output control node.

* * * * *